United States Patent
Mun et al.

(10) Patent No.: US 11,210,016 B2
(45) Date of Patent: Dec. 28, 2021

(54) METHOD OF OPERATING MEMORY CONTROLLER AND MEMORY SYSTEM, AND THE MEMORY SYSTEM

(71) Applicant: SAMSUNG ELECTRONICS CO., LTD., Suwon-si (KR)

(72) Inventors: Kui-Yon Mun, Hwaseong-si (KR); Sung-Kyu Park, Seoul (KR); Beom-Kyu Shin, Seongnam-si (KR); Young-Seok Hong, Hwaseong-si (KR); Jae-Yong Jeong, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/544,178

(22) Filed: Aug. 19, 2019

(65) Prior Publication Data
US 2020/0201561 A1    Jun. 25, 2020

(30) Foreign Application Priority Data
Dec. 19, 2018    (KR) .................. 10-2018-0165532

(51) Int. Cl.
*G06F 3/06* (2006.01)
*G06F 12/02* (2006.01)

(52) U.S. Cl.
CPC .......... *G06F 3/0656* (2013.01); *G06F 3/0607* (2013.01); *G06F 3/0658* (2013.01); *G06F 3/0679* (2013.01); *G06F 12/0246* (2013.01)

(58) Field of Classification Search
CPC .... G06F 12/0246; G06F 3/0607; G06F 3/061; G06F 3/0619; G06F 3/0656; G06F 3/0658; G06F 3/0679
See application file for complete search history.

(56) References Cited

U.S. PATENT DOCUMENTS

| | | | |
|---|---|---|---|
| 7,245,527 B2 | 7/2007 | Qureshi et al. | |
| 7,353,324 B2 | 4/2008 | Tanaka | |
| 8,131,912 B2 | 3/2012 | Ozawa et al. | |
| 8,838,879 B2 | 9/2014 | Yoshida | |
| 8,924,661 B1* | 12/2014 | Shachar | G06F 13/1657 711/158 |
| 9,141,537 B2 | 9/2015 | Smith et al. | |
| 9,396,108 B2 | 7/2016 | Kim et al. | |
| 9,423,979 B2 | 8/2016 | Oikawa | |
| 9,766,974 B2 | 9/2017 | Hsiao et al. | |
| 9,847,122 B2 | 12/2017 | Choi et al. | |
| 2010/0191896 A1 | 7/2010 | Yang et al. | |
| 2016/0259583 A1 | 9/2016 | Kasa et al. | |
| 2019/0294383 A1* | 9/2019 | Law | G06F 3/0659 |

\* cited by examiner

*Primary Examiner* — Yong J Choe
(74) *Attorney, Agent, or Firm* — F. Chau & Associates, LLC

(57) ABSTRACT

A method of controlling a first memory controller that controls a non-volatile memory device includes: the first memory controller receiving first data and a first physical address from a second memory controller via a first interface of the first memory controller; the first memory controller storing the first data in a non-volatile memory buffer of the first memory controller; and the first memory controller programming the first data stored in the non-volatile memory buffer in a first physical region of the non-volatile memory device corresponding to the first physical address.

20 Claims, 23 Drawing Sheets

METHOD OF OPERATING MEMORY CONTROLLER AND MEMORY SYSTEM, AND THE MEMORY SYSTEM

CROSS-REFERENCE TO RELATED APPLICATION

This U.S. non-provisional patent application claims the benefit of priority under 35 USC § 119 to Korean Patent Application No. 10-2018-0165532, filed on Dec. 19, 2018, in the Korean Intellectual Property Office, the disclosure of which is incorporated by reference in its entirety herein.

BACKGROUND

1. Technical Field

The inventive concept relates to a memory system, and more particularly, to a memory system including a non-volatile memory device, a method of operating the memory system, and a memory controller included in the memory system.

2. Discussion of Related Art

A non-volatile memory retains stored data even when power is no longer supplied. A flash memory is an example of a nonvolatile memory that can be electrically erased and reprogrammed. Storage devices including flash memories such as embedded Multi-Media Card (eMMC), Universal Flash Storage (UFS), solid state drive (SSD), and memory cards have been widely used to store and transfer a large amount of data.

However, the writing reliability of a flash memory may be reduced if it is experiences to many programming cycles. Further, since an erase operation can only be performed on a block-wise basis, a flash memory may have a lower writing performance than other types of nonvolatile memory. Thus, there is a need for a method and apparatus for improving writing reliability and writing performance of a nonvolatile memory device.

SUMMARY

At least one embodiment of the inventive concept provides a memory system including a plurality of memory controllers and a memory device, a method of operating the memory system, and a method of operating a memory controller.

According to an exemplary embodiment of the inventive concept, there is provided a method of operating a first memory controller that controls a non-volatile memory device, the method including: the first memory controller receiving first data and a first physical address from a second memory controller via a first interface of the first memory controller; the first memory controller storing the first data in a non-volatile memory buffer of the first memory controller; and the first memory controller programming the first data stored in the non-volatile memory buffer in a first physical region of the non-volatile memory device corresponding to the first physical address.

According to an exemplary embodiment of the inventive concept, there is provided a method of operating a memory control system that controls a non-volatile memory device, the method including: receiving, by a second controller, write data and a first physical address from a first controller via a first interface; storing, by the second controller, the write data in a non-volatile memory buffer of the second controller; and performing, by the second controller, a write operation on the non-volatile memory device using the write data stored in the non-volatile memory buffer and the first physical address, and outputting, by the second controller, a signal to the first controller indicating whether the write operation completed successfully or failed.

According to an exemplary embodiment of the inventive concept, there is provided a memory system including: a first controller receiving an access request for a non-volatile memory device and a logical address from a host, the first controller being configured to convert the logical address to a physical address; and a second controller receiving the physical address from the first controller, the second controller controlling write data to be written in a storage region of the non-volatile memory device, the storage region corresponding to the physical address and controlling read data to be read from the storage region.

BRIEF DESCRIPTION OF THE DRAWINGS

Embodiments of the inventive concept will be more clearly understood from the following detailed description taken in conjunction with the accompanying drawings in which:

FIGS. 16A, 16B, and 16C are diagrams illustrating a method of operating a memory system, according to an exemplary embodiment of the inventive concept, during power-off and power-on;

DETAILED DESCRIPTION OF THE EXEMPLARY EMBODIMENTS

Figure 1:
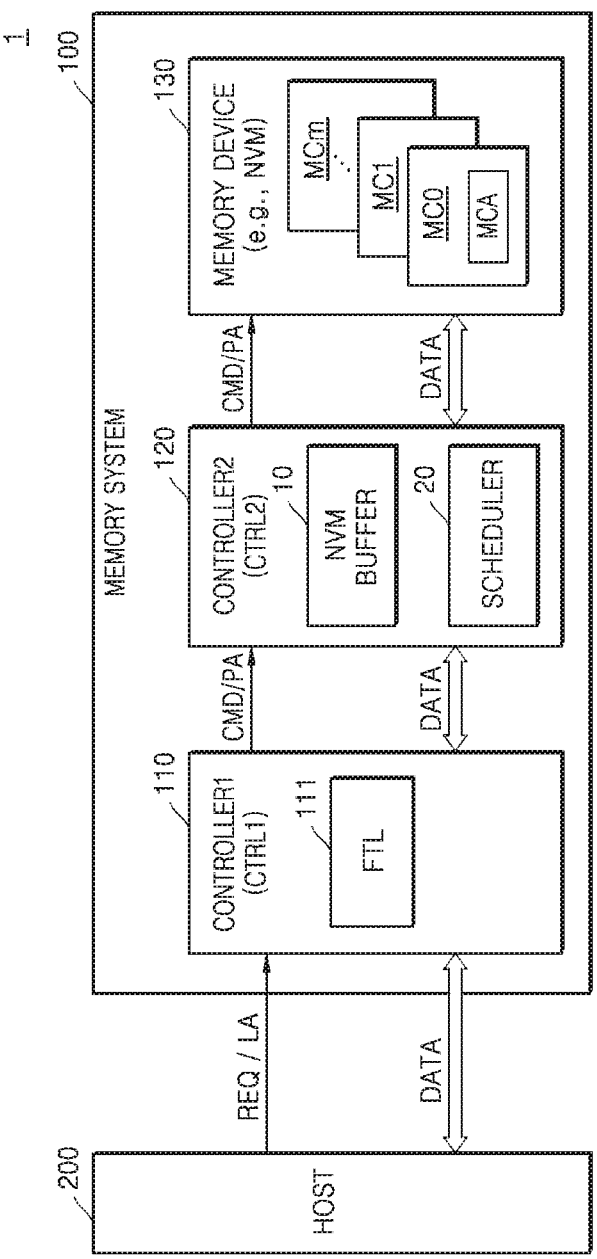
FIG. 1 is a block diagram of a data processing system including a memory system according to an exemplary embodiment of the inventive concept.

Hereinafter, one or more exemplary embodiments of the inventive concept will be described in detail with reference to accompanying drawings. The present disclosure may, however, be embodied in many different forms and should not be construed as limited to the embodiments set forth herein. Like reference numerals refer to like elements throughout this application.

FIG. 1 is a block diagram of a data processing system 1 including a memory system according to an exemplary embodiment of the inventive concept.

The data processing system 1 may be embedded in an electronic device or may be implemented as an electronic device. Examples of the electronic device may include a personal computer (PC), a data server, an ultra mobile PC (UMPC), a workstation, a net-book, a network-attached storage (NAS), a smart television, an Internet of Things (IoT) device, and a portable electronic device. The portable electronic device may include, for example, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book reader, or a wearable device.

Referring to FIG. 1, the data processing system 1 includes a host 200 and a memory system 100.

The host 200 may store data DATA in the memory system 100 and read data from the memory system 100. The host 200 may denote a data processing apparatus that processes data. Examples of the data processing apparatus include a central processing unit (CPU), a processor, a micro-processor, or an application processor (AP). For example, the host 200 may be implemented as a system-on-chip (SoC).

The host 200 may communicate with the memory system 100 via a set interface protocol. The host 200 may transmit an access request REQ for writing or reading data to the memory system 100 and an address indicating a location to be accessed (e.g., a logical address LA) to the memory system 100. The access request REQ may be a command including a write request or a read request. The memory system 100 may operate in response to the access request REQ.

The memory system 100 may operate in response to the access request REQ received from the host 200 (e.g., the write/read request) and may store data DATA received from the host 200. That is, the memory system 100 may be used as a storage device of the host 200.

The memory system 100 may be implemented as one of various storage devices, according to a host interface protocol set for connecting to the host 200. For example, the memory system 100 may be an internal memory embedded in an electronic device. For example, the memory system 100 may be implemented as one of various storage devices, for example, an embedded multimedia card (eMMC), an MMC, a solid state drive (SSD), universal flash storage (UFS), an embedded UFS, a reduced size MMC (RS-MMC), a multi-media card of a micro-MMC type, a compact flash (CF) card, a secure digital (SD) card, a micro secure digital (Micro-SD) card, a mini-SD card, an extreme digital (XD) card, a smart media card, or a memory stick.

The memory system 100 includes a memory device 130 storing data accessed by the host 200, and memory controllers, that is, a first controller 110 (e.g., a first control circuit) and a second controller 120 (e.g., a second control circuit), controlling data storage/reading of the memory device 130. In the embodiment, the first controller 110 and the second controller 120 or the first controller 110, the second controller 120, and the memory device 130 are integrated as one semiconductor device. As a non-limiting example, the first controller 110, the second controller 120, and the memory device 130 may be implemented as a semiconductor module.

The memory device 130 may store data. The memory device 130 may include a non-volatile memory device capable of retaining stored data even after an electric power supply is no longer provided to the memory system 100.

The memory device 130 includes a plurality of memories MC0 to MCm (m is a positive integer). For example, the plurality of memories MC0 to MCm may each include a memory chip including a memory cell array MCA. The memory cell array MCA may include a plurality of memory blocks. In one embodiment, the memory cell array MCA includes a plurality of flash memory cells, for example, the plurality of flash memory cells may be NAND flash memory cells. However, embodiments of the inventive concept are not limited thereto, that is, the memory cells may include resistive memory cells such as resistive RAM (ReRAM), phase change RAM (PRAM), or magnetic RAM (MRAM). Hereinafter, descriptions will be provided assuming that the memory device 130 is a NAND flash memory device.

In an exemplary embodiment, each of the memory cells included in the memory cell array MCA is a single-level cell SLC storing one-bit data. In another exemplary embodiment, each of the memory cells included in the memory cell array MCA is a multi-level cell MLC storing data of two or more bits. For example, each memory cell included in the memory cell array MCA may be a triple-level cell TLC storing three-bit data or a quadruple-level cell storing four-bit data.

In an exemplary embodiment, the memory cell array MCA includes a two-dimensional memory array implemented as a NAND flash memory having a two-dimensional horizontal structure. In another exemplary embodiment, the memory cell array MCA includes a three-dimensional (3D) memory array implemented as a NAND flash memory having a 3D vertical structure. A 3D memory array may be formed monolithically in at least one physical level of memory cell arrays each having an active area disposed above a silicon substrate and a circuit formed above or within the silicon substrate, wherein the circuit is associated with the operation of those memory cells. As used herein, the term "monolithic" denotes that layers of each level of the array are directly deposited on the layers of each underlying level of the array. In an exemplary embodiment, the 3D memory array includes vertical NAND strings that are vertically oriented such that at least one memory cell is located over another memory cell. The at least one memory cell may include a charge trap layer. The following patent documents, which are hereby incorporated by reference in their entireties, describe example configurations of 3D memory arrays, in which the 3D memory array may be configured in a plurality of levels, with word lines and/or bit lines shared between levels: U.S. Pat. Nos. 7,679,133; 8,553,466; 8,654,587; 8,559,235; and U.S. Patent Application Publication No. 2011/0233648.

The first controller 110 and the second controller 120 may control the memory device 130 so as to write or read data to/from the memory device 130. The first controller 110 and the second controller 120 may be referred to as a memory control system or a memory control circuit. In an exemplary embodiment, the first controller 110 and the second controller 120 control the memory device 130 in response to the write/read request from the host 200 or for performing background operations, so that data DATA (data transmitted from the host 200 or internally generated data) is written in the memory device 130 or data stored in the memory device 130 may be read. In an exemplary embodiment, the first controller 110 and the second controller 120 control the memory device 130 so as to write the internally generated data in the memory device 130 or to read the data stored in the memory device 130 for performing the background operations. The first controller 110 and the second controller 120 may be integrated as one semiconductor device, or the first controller 110 and the second controller 120 may be provided as separate semiconductor chips and implemented as a semiconductor module, in which the first and second controllers 110 and 120 are connected to one another via a connection member (e.g., an interconnector or an interposer).

The first controller 110 may control overall operation of the memory system 100. The first controller 110 may manage a status (power status, a temperature, power-on/off, etc.) of the memory system 100. The first controller 110 may control writing (or programming), reading, and erasing operations performed on the memory device 130. In addition, the first controller 110 may control various background operations with respect to the memory device 130. For example, the background operations may include garbage collection, bad block management, read reclaim, and read replacement.

The first controller 110 analyzes the access request REQ from the host 200 in order to write or read data to/from the memory device 130 and generates a command CMD according to the access request REQ. In addition, the first controller 110 converts the logical address LA transmitted from the host 200 to a physical address PA. The logical address LA may be an address recognized by the host 200 and the physical address PA may denote a storage region in the memory device 130, which corresponds to the logical address LA, that is, a physical region. The physical address PA may include at least one of a physical block number and a physical page number. For example, the physical block number may be used to identify a memory block of a memory cell array of the memory device 130, and the physical page number may be used to identify a page within the memory block.

The first controller 110 may include a flash translation layer (FTL) 111. The FTL 111 may be implemented as firmware or software. In an embodiment, the FTL 111 maps the logical address LA to the physical address PA and manage mapping information between the logical address LA and the physical address PA. The mapping information may be located in a mapping table that is maintained by the FTL 111.

The writing and reading of data in the memory device 130 implemented as the NAND flash memory may be performed in units of pages, and erasing may be performed in units of blocks. Since erasing of a block needs to be performed before writing, overwriting is not permitted. In a case in which the address provided from the host 200 (e.g., the logical address LA) directly designates a physical region in the memory device 130, when a write request with respect to one address is received a plurality of times from the host 200, the erasing in units of blocks has to be performed a plurality of times with respect to the write request in units of pages. Thus, it is difficult to rapidly process the write request and degradation in the memory cells may be accelerated. Therefore, the FTL 111 allocates the physical address PA to the logical address LA and writes data in a physical region corresponding to the physical address PA, and when a write request with respect to the logical address LA is received again, the FTL 111 changes the physical address PA allocated to the logical address LA and writes data in a physical region corresponding to the changed physical address PA. The FTL 111 generates mapping information by allocating the physical address PA to the logical address LA and may convert the logical address LA provided from the host 200 into the physical address PA by referring to the mapping information. When the physical address PA with respect to the logical address LA is changed, the FTL 111 stores the logical address LA and the changed physical address PA as mapping information to update the mapping information.

In an exemplary embodiment, the first controller 110 generates a command CMD that is necessary to perform the background operation and a physical address PA indicating a physical region in which the background operation is to be performed. The first controller 110 may generate metadata for managing the memory device 130 and may control the data that is internally generated to be stored in the memory device 130. The metadata may include the mapping information between the logical address LA and the physical address PA, a cell degradation degree in memory blocks of the memory device 130, or wear-leveling information.

The first controller 110 may execute a write task by transferring the command CMD including the write request and the physical address PA, as well as the data DATA, to the second controller 120. The first controller 110 may execute a read task by transferring a command CMD including a read request and the physical address PA to the second controller 120. In an embodiment, the command CMD includes the physical address PA. For example, the command CMD may include a type of the command (e.g., type indicates command is a write command or type indicates command is a read command) and the physical address PA, and additionally may further include various kinds of information according to the access request REQ.

The second controller 120 may control a write (or programming) operation and a read operation performed on the memory device 130. In an exemplary embodiment, the second controller 120 operates as a sub-controller of the first controller 110 and supports the write and read operations of the first controller 110 by controlling buffering and transmission of the data DATA in the write and read operations between the first controller 110 and the memory device 130.

The second controller 120 includes a non-volatile memory buffer 10 and a scheduler 20 (e.g., a scheduling circuit). The non-volatile memory buffer 10 may store data to be written in the memory device 130. The non-volatile memory buffer 10 may include non-volatile memory cells that may retain stored data even when no longer receiving an electric power supply (e.g., the electric power supply is blocked). For example, the non-volatile memory buffer 10 may include magnetic RAM (MRAM), phase change RAM (PRAM), or resistive RAM (ReRAM). However, embodiments of the inventive concept are not limited thereto. For example, the non-volatile memory buffer 10 may include various kinds of non-volatile memory including flash memory, nano-floating gate memory (NFGM), polymer random access memory (PoRAM), or ferroelectric random access memory (FRAM).

The scheduler 20 may perform scheduling of the program operation performed on the memory device 130. The scheduler 20 schedules a time for programming, the order of programming, and the number of times that programming is performed, for programming data stored in the non-volatile memory buffer 10 in the memory device 130 according to a writing method and/or programming method set with respect to the memory device 130, and then controls a write (or programming) operation performed on the memory device 130. In an exemplary embodiment, the set writing method and/or programming method varies depending on a status or state of the memory device 130.

In the memory system 100 according to an exemplary embodiment, the second controller 120 includes the non-volatile memory buffer 10, and the non-volatile memory buffer 10 buffers the data stored in the memory device 130. The memory system 100 may include a capacitor (e.g., a power capacitor) providing temporary power for preventing the data from being lost when the power supplied to the memory system 100 is suddenly blocked. The non-volatile memory buffer 10 may retain the data even when the power supply is blocked. Therefore, a capacity of the capacitor may be reduced, and thus an area of the memory system 100 may be reduced. In addition, since the second controller 120 schedules the write/read operations of the data in the memory system 100 according to the embodiment, the first controller 110 may have less burden controlling the write/read operations and a degree of freedom in operation of the first controller 110 may increase.

Figure 2:
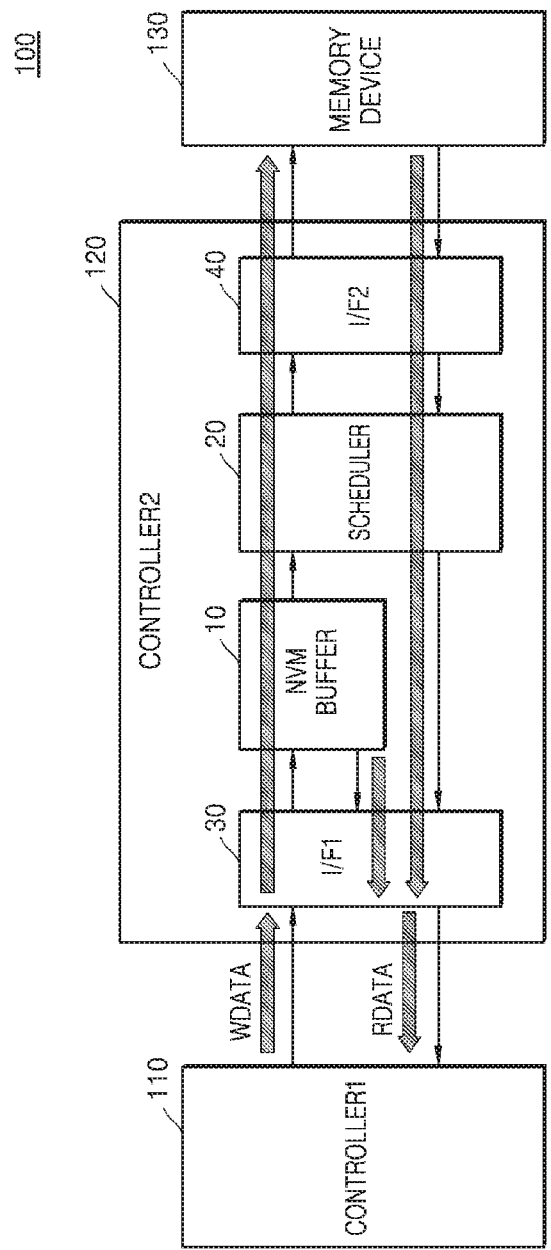
FIG. 2 is a diagram illustrating writing and reading operations in a memory system according to an exemplary embodiment of the inventive concept.

FIG. 2 is a diagram illustrating writing and reading operations in a memory system according to an exemplary embodiment of the inventive concept.

Referring to FIG. 2, the second controller 120 is connected to the first controller 110 and the memory device 130. The second controller 120 includes the non-volatile memory buffer 10, the scheduler 20, a first interface 30 (e.g., an interface circuit), and a second interface 40 (e.g., an interface circuit), and may transmit/receive data to/from the first controller 110 via the first interface 30 and transmit/receive data to/from the memory device 130 via the second interface 40. The first interface 30 and the second interface 40 may be each referred to as a memory interface and may include interface protocols of the same type or different types. For example, the first and second interfaces 30 and 40 may be each configured to communicate with the first controller 110 and the memory device 130 via at least one of various interface protocols such as universal serial bus (USB), MMC, peripheral component interconnect-express (PCI-E), advanced technology attachment (ATA), serial-ATA, parallel-ATA, small computer system interface (SCSI), enhanced small device interface (ESDI), or integrated drive electronics (IDE).

Although not shown, the first controller 110 may also include at least two interfaces. The first controller 110 may include a host interface for communicating with the host 200 and a memory interface for communicating with the second controller 120. The memory interface in the first controller 110 may include an interface protocol that is the same as that of the first interface 30 in the second controller 120.

In the write operation, the second controller 120 receives write data WDATA from the first controller 110 via the first interface 30, and stores the write data WDATA in the non-volatile memory buffer 10. The write data WDATA stored in the non-volatile memory buffer 10 may be output according to control of the scheduler 20 and may be transferred to the memory device 130 via the second interface 40.

In the read operation, the second controller 120 receives the read data RDATA from the memory device 130 via the second interface 40, and transmits the read data RDATA to the first controller 110 via the first interface 30 according to control of the scheduler 20. In an embodiment, the second controller 120 temporarily stores the read data RDATA output from the memory device 130 in the non-volatile memory buffer 10, and then outputs the read data RDATA from the non-volatile memory buffer 10 and transmits the read data RDATA to the first controller 110. In an exemplary embodiment, when the write read RDATA that is requested to be read from the first controller 110 is already stored in the non-volatile memory buffer 10, the second controller 120 outputs the read data RDATA directly from the non-volatile memory buffer 10, not from the memory device 130, and then transmits the read data RDATA to the first controller 110.

In an exemplary embodiment, the first controller 110 is configured to set the second controller 120 to a bypass mode. When the second controller 120 is set to the bypass mode, the data received from the first controller 110 (e.g., the write data WDATA) is directly transmitted to the second interface 40 from the first interface 30 without being stored in the non-volatile memory buffer 10 or passing through the scheduler 20, and is then transmitted to the memory device 130 via the second interface 40. When the second controller 120 is set to the bypass mode, the data received from the memory device 130 (e.g., the read data RDATA) is directly transmitted to the first interface 30 from the second interface 40 and is then transmitted to the first controller 110 via the first interface 30.

Figure 3:
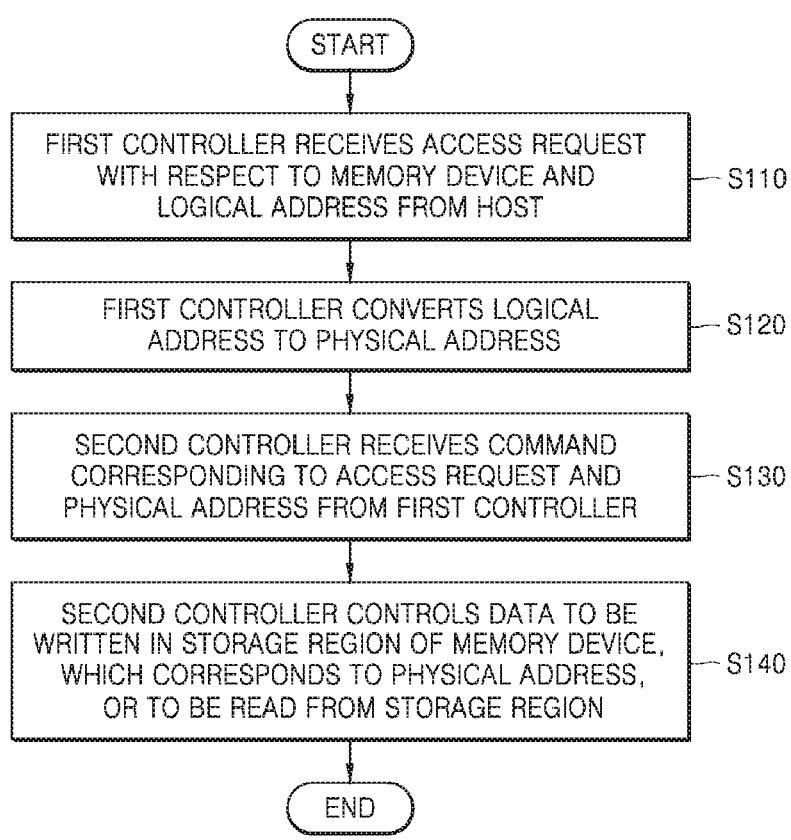
FIG. 3 is a flowchart illustrating a method of operating a memory system, according to an exemplary embodiment of the inventive concept.

FIG. 3 is a flowchart illustrating a method of operating the memory system 100, according to an exemplary embodiment of the inventive concept. Operations illustrated in FIG. 3 may be executed in the memory system 100 shown in FIG. 1 and FIG. 2, and will be described with reference to FIGS. 1 and 2.

Referring to FIG. 3, the first controller 110 receive an access request with respect to the memory device 130 and a logical address LA from the host 200 (S110). The access request may include a write request or a read request. The first controller 110 may receive the access request and the logical address via the host interface.

The first controller 110 converts the logical address to the physical address (S120). For example, the first controller 110 may convert the logical address to the physical address by allocating the physical address to the logical address in response to a write request and may manage mapping information indicating a mapping relation between the logical address and the physical address. Also, the first controller 110 may convert the logical address to the physical address by detecting the physical address with respect to the logical address with reference to the mapping information stored in advance in response to the read request. The first controller 110 may generate a command corresponding to the access request. For example, the first controller 110 may generate a write command for controlling the write operation of the memory device 130 in response to the write request or may generate a read command for controlling a read operation of the memory device 130 in response to the read request.

The second controller 120 receives a command and a physical address corresponding to the access request from the first controller 110 (S130). The second controller 120 receives the write command or the read command via the first interface 30 and may also receive the physical address.

The second controller 120 controls the memory device 130 so that data is written in a storage region (e.g., a physical region) of the memory device 130 corresponding to the physical address or is read from the storage region. The second controller 120 provides the memory device 130 with the command and the physical address via the second interface 40 to control the data to be written or to be read. In the embodiment, the second controller 120 may receive a plurality of commands and a plurality of physical addresses from the first controller 110, schedule a write or read operation of data based on a programming method or a writing method, and provide the plurality of commands and the plurality of physical addresses to the memory device 130 according to a scheduled order. The programming method or the writing method may be set in advance. The memory device 130, based on the received command and the physical address, may program the data received with the command and the physical address in the memory cell array or may read the data from the storage region corresponding to the physical address.

While the operation in which the memory system 100 writes or reads the data to or from the memory device 130 in response to the request from the host 200 is described, embodiments of the inventive concept are not limited thereto. For example, the first controller 110 may determine to store or read internal data that is internally generated in the memory system 100 and may generate a physical address corresponding to the storage region of the memory device 130, which is to be accessed for storing or reading the internal data.

Figure 4:
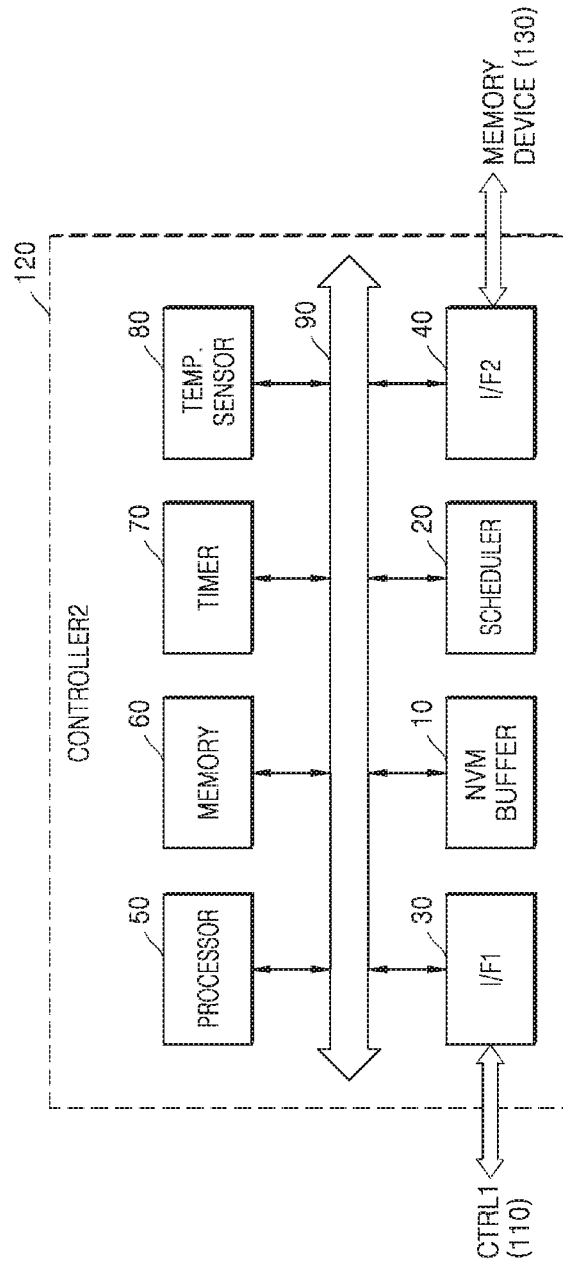
FIG. 4 is a block diagram of a second controller according to an exemplary embodiment of the inventive concept.

FIG. 4 is a block diagram of the second controller 120 according to an exemplary embodiment of the inventive concept.

Referring to FIG. 4, the second controller 120 includes the first interface 30, the non-volatile memory buffer 10, the scheduler 20, and the second interface 40, and may further include a processor 50, a memory 60, a timer 70 (e.g., timer logic or circuit), and a temperature sensor 80 for controlling write and read operations. The elements of the second controller 120 may communicate with one another via a bus 90.

The processor 50 may include a central processing unit or a microprocessor, and may control overall operation of the second controller 120. In an embodiment, the processor 50 is implemented as a multi-core processor (e.g., a dual-core processor or a quad-core processor).

The memory 60 operates according to control of the processor 50, and may be used as an operating memory or a cache memory. The memory 60 may store a program and/or data for operating the second controller 120, or data generated by the second controller 120. The memory 60 may be implemented as a volatile memory such as DRAM or static RAM (SRAM). However, embodiments of the inventive concept are not limited thereto. For example, the memory 60 may be implemented as a non-volatile memory such as PRAM or a flash memory.

The timer 70 may measure a time at which events occur in the second controller 120 or an elapsed time from the occurrence of the event. For example, the timer 70 may measure a time when the data received from a first controller CTRL1 is stored in the non-volatile memory buffer 10 or an elapsed time after storing the data. Alternatively, the timer 70 may measure a time when the data stored in the non-volatile memory buffer 10 is programmed in the memory device 130 or an elapsed time after the programming. The timer 70 may provide the measured time to the processor 50.

The temperature sensor 80 may measure a temperature at a time point at which the events occur in the second controller 120. For example, the temperature sensor 80 may measure a temperature when the data is stored in the non-volatile memory buffer 10 or a temperature when the data is programmed in the memory device 130. The temperature sensor 80 may provide the measured temperature to the processor 50. In an embodiment, the timer 70 and/or the temperature sensor 80 are directly connected to the processor 50. For example, the timer 70 may directly transmit time information to the processor 50 without using bus 90 and/or the temperature sensor 80 may directly transmit temperature information to the processor 50 without using the bus 90.

The first interface 30 may communicate with the first controller 110, and the second interface 40 may communicate with the memory device 130.

The non-volatile memory buffer 10 may store (buffer) data received from the first controller 110 via the first interface 30. As described above with reference to FIG. 2, the non-volatile memory buffer 10 may be implemented as a non-volatile memory (e.g., MRAM).

The scheduler 20 may schedule the programming operation and the read operation according to the writing method and/or the program method set in advance with reference to the memory device 130. The programming operation and the read operation according to the scheduling of the scheduler 20 will be described in detail later with reference to FIGS. 9 to 15B. The scheduler 20 may be implemented as software (or firmware) or hardware. When the scheduler 20 is implemented as software or firmware, the scheduler 20 is loaded on the memory 60, and a scheduling operation of the scheduler 20 is executed when the processor 50 executes the software or firmware.

While the non-volatile memory buffer 10 is illustrated as being included in the second controller 120, embodiments of the inventive concept are not limited thereto. In an embodiment, the non-volatile memory buffer 10 is implemented as a separate device outside the second controller 120. The second controller 120 may further include a non-volatile memory interface for communicating with the non-volatile memory buffer 10 and may store data received from the first controller 110 via the non-volatile memory interface in the non-volatile memory buffer 10 and may read data from the non-volatile memory buffer 10.

Figure 5:
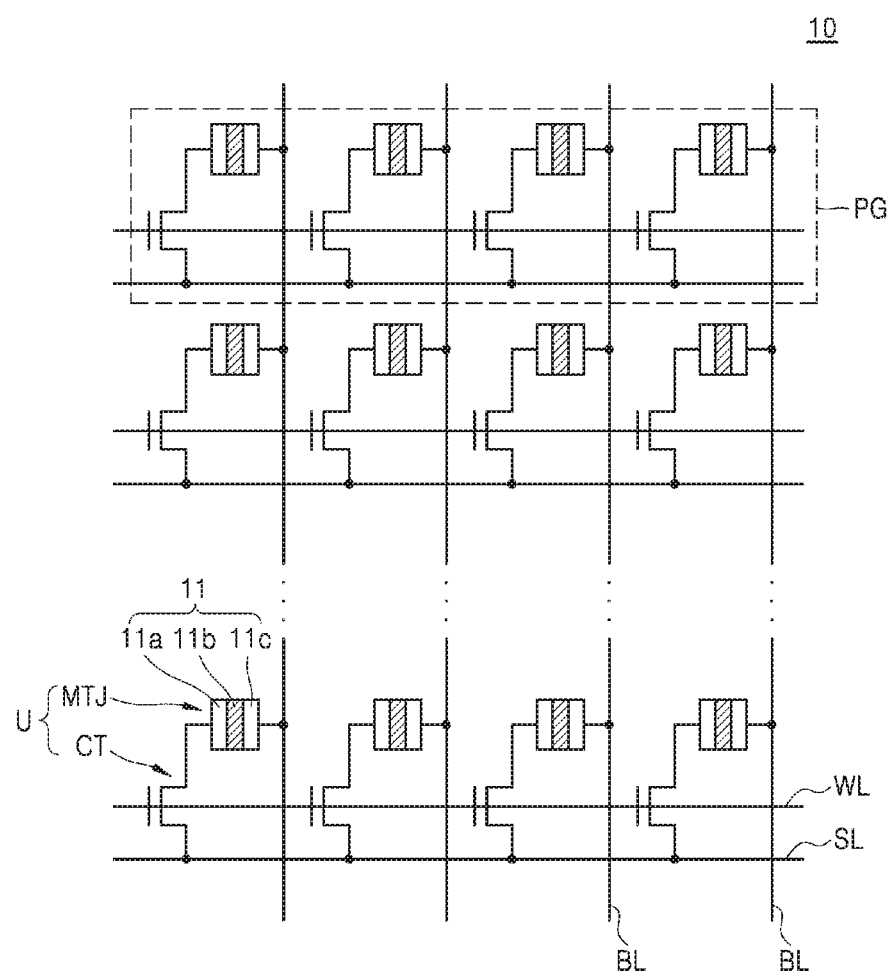
FIG. 5 is a diagram showing an example of a memory cell array in a non-volatile memory buffer according to an exemplary embodiment of the inventive concept.

FIG. 5 is a diagram showing an example of a memory cell array in a non-volatile memory buffer according to an exemplary embodiment. FIG. 5 illustrates a cell array of MRAM.

Referring to FIG. 5, an MRAM cell array includes a plurality of word lines WL, a plurality of bit lines BL, a plurality of source lines SL, and a plurality of memory cells U arranged at regions where the word lines WL and the bit lines BL cross each other. A unit memory cell U may include a magnetic tunnel junction (MTJ) structure 11 and a cell transistor CT and may be selected by selecting one bit line BL and one source line SL. Accordingly, the MRAM cell array may have a 1MTJ-1TR structure. In an embodiment, the unit memory cell U includes a perpendicular MTJ (pMTJ). The MTJ structure 11 may include a pinned layer 11a, a tunnel layer (or barrier layer) 11b, and a free layer 11c. The pinned layer 11a is connected to a drain of a cell transistor CT, and the free layer 11c is connected to the bit line BL. A source of the cell transistor CT is connected to the source line SL, and a gate of the cell transistor CT is connected to the word line WL. The pinned layer 11a and the free layer 11c may be magnetized in one of two directions, and a resistance value of the MTJ structure 11 may vary depending on a magnetization direction of each of the pinned layer 11a and the free layer 11c. Data may be programmed (e.g., stored, or deleted) based on a variation in the resistance value of the MTJ structure 11.

As described above, the MRAM cell array is a non-volatile memory cell array based on magneto-resistance. Since the MRAM cell array is non-volatile, the stored data may be retained even when electric power is turned off. In addition, the MRAM cell array MRCA may perform write, read, and erase operations of data in units of pages PG, according to voltages applied to the word line WL, the bit line BL, and the source line SL.

Figure 6:
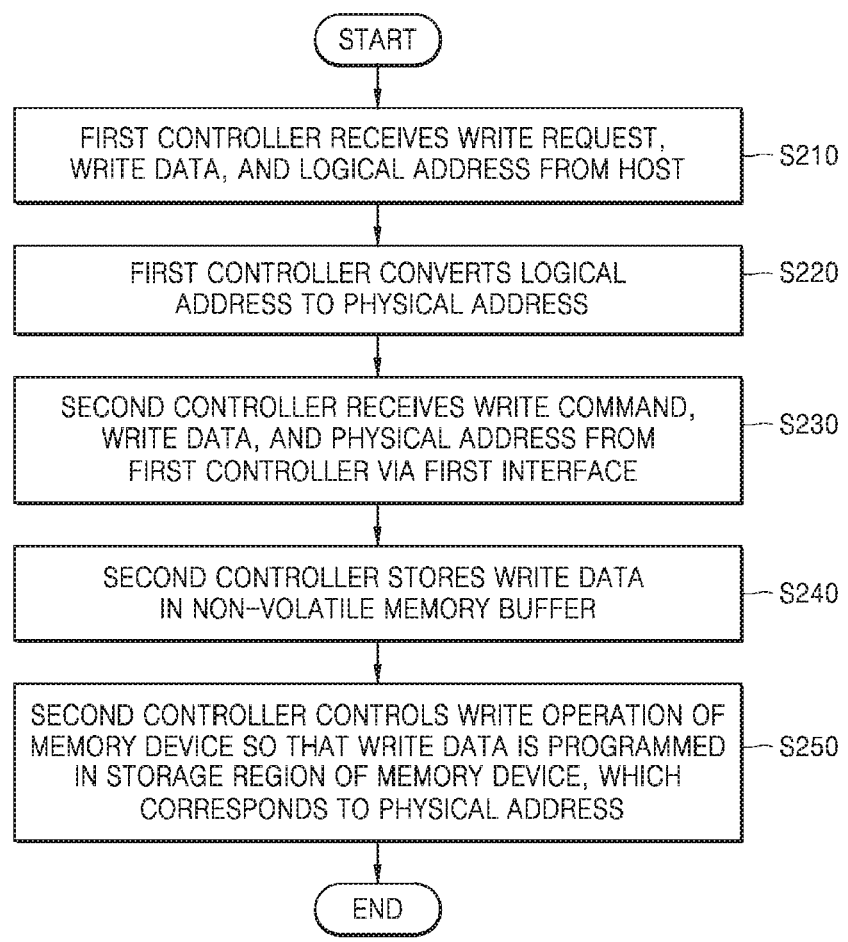
FIG. 6 is a flowchart illustrating a writing method in a memory system, according to an exemplary embodiment of the inventive concept.
Figure 7:
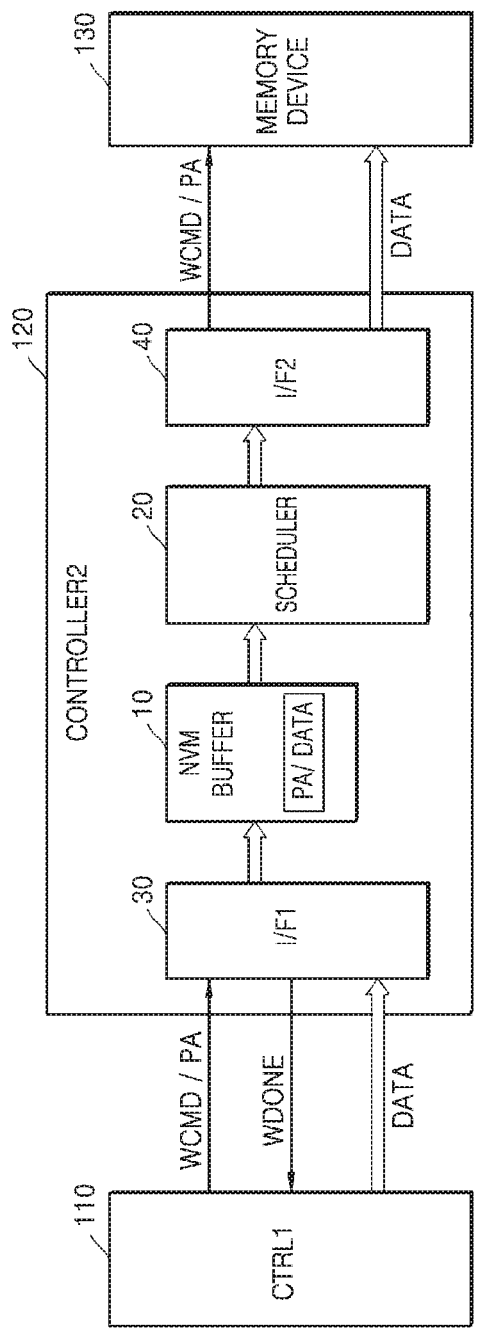
FIG. 7 is a diagram illustrating a writing method in a memory system, according to an exemplary embodiment of the inventive concept.

FIG. 6 is a flowchart illustrating a writing method in a memory system according to an exemplary embodiment of the inventive concept, and FIG. 7 is a diagram illustrating a writing method in a memory system according to the embodiment. Referring to FIGS. 6 and 7, the writing method in the memory system according to the embodiment will be described below.

Referring to FIG. 6, the first controller 110 receives a write request, a logical address, and write data from the host 200 (S210). The first controller 110 may communicate with the host 200 via a host interface and may receive the write request, the logical address, and the write data from the host 200.

The first controller 110 converts the logical address into a physical address (S220). The physical address denotes a storage region of the memory device 130, in which the write data is to be stored, that is, a physical region. The first controller 110 may also generate a write command WCMD according to the write request. In an embodiment, the first controller 110 generates a write command WCMD and a physical address PA for storing data that is internally generated, without receiving a write command from the host.

The second controller 120 may receive a write command WCMD, a physical address PA, and data DATA to be written in the memory device 130 (hereinafter, referred to as write data) from the first controller 110 via the first interface 30. The write data DATA may be the data received from the host 200 or data generated by or managed by the first controller 110.

The second controller 120 stores the write data DATA in the non-volatile memory buffer 10 (S240). The second controller 120 may store the write data DATA and the physical address PA corresponding thereto in the non-volatile memory buffer 10. In an embodiment, when receiving the write data DATA and the physical address PA associated with the write data DATA from the first controller 110, the second controller 120 stores the write data DATA in the non-volatile memory buffer 10. In another embodiment, the second controller 120 stores the write data DATA in the non-volatile memory buffer 10 in response to a request from the first controller 110 (e.g., a command requesting storage). In an embodiment, when the write data is stored in the non-volatile memory buffer 10, the second controller 120 transmits a write completion signal WDONE to the first controller 110.

The second controller 120 controls the write operation of the memory device 130 so that the write data DATA is programmed in a storage region of the memory device 130, which corresponds to the physical address PA (S250). The second controller 120 may read the write data DATA from the non-volatile memory buffer 10 and transmit the write data DATA and the physical address PA to the memory device 130 via the second interface 40. The memory device 130 may program the write data DATA in the storage region corresponding to the physical address PA.

In addition, in operations S230 and S240, the second controller 120 may receive a plurality of write commands, a plurality of logical addresses, and a plurality pieces of write data corresponding to the plurality of write commands and the plurality of logical addresses from the first controller 110 and may store the plurality pieces of write data in the non-volatile memory buffer 10. The second controller 120, in particular, the scheduler 20, may determine an order of writing the plurality of pieces of write data, an order of programming, and the number of programming operations according to the writing method and/or program method and may provide the plurality of logical addresses and corresponding plurality pieces of write data to the memory device 130 according to the determined order and the number of times. This will be described below with reference to FIGS. 8 to 11B.

Figure 8:
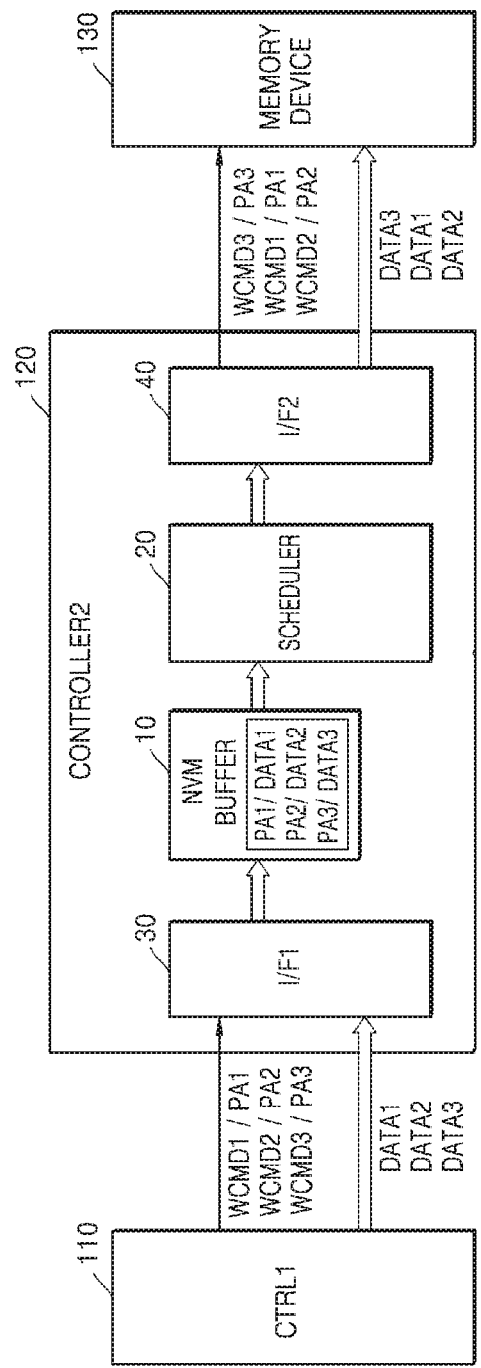
FIG. 8 is a diagram illustrating a writing method in a memory system, according to an exemplary embodiment of the inventive concept.

FIG. 8 is a diagram illustrating a writing method in a memory system according to an exemplary embodiment of the inventive concept.

Referring to FIG. 8, the first controller 110 sequentially transmits a plurality of write commands, a plurality of physical addresses, and a plurality pieces of data respectively corresponding to the write commands to the second controller 120.

For example, the first controller 110 may transmit the first write command WCDMA1, a first physical address PA1, and first write data DATA1 to the second controller 120 at a first time, may transmit a second write command WCDMA2, a second physical address PA2, and second write data DATA2 to the second controller 120 at a second time, and then, may transmit a third write command WCDMA3, a third physical address PA3, and third write data DATA3 to the second controller 120 at a third time. The second controller 120 may store the first write data DATA1, the second write data DATA2, and the third write data DATA3 in the non-volatile memory buffer 10. The first to third physical addresses PA1 to PA3 may be stored with corresponding write data. In an embodiment, the first write command WCMDA1, first physical address PA1, and first write data DATA1 are transmitted to the second controller 120 at a first time, the second write command WCMDA2, second physical address PA2, and second write data DATA21 are transmitted to the second controller 120 at a second time after the first time, and the third write command WCMDA3, third physical address PA3, and third write data DATA3 are transmitted to the second controller 120 at a third time after the second time.

The scheduler 20 may determine an order of writing the first to third write data DATA1 to DATA3 according to the set writing method (or write policy). For example, the scheduler 20 may determine the writing order based on a priority order of write data. The scheduler 20 may transmit the first to third write data DATA1 to DATA3 to the memory device 130 according to the determined writing order. The scheduler 20 may sequentially read the first to third write data DATA1 to DATA3 from the non-volatile memory buffer 10 according to the determined writing order and may transmit the read out write data, the corresponding physical addresses, and write commands to the memory device 130 via the second interface 40.

In an embodiment, the scheduler 20 transmits the first to third write data DATA1 to DATA3 to the memory device 130 according to a receiving order or a storing order in the non-volatile memory buffer 10. In an embodiment, the scheduler 20 transmits the first to third write data DATA1 to DATA3 to the memory device 130 according to an order that is determined regardless of the receiving order or the storing order in the non-volatile memory buffer 10. Accordingly, as shown in FIG. 8, the third write data DATA3 that is received last from among the first to third write data DATA1 to DATA3 may be firstly transmitted to the memory device 130. The memory device 130 may program the received write data in a storing region corresponding to the physical address. Accordingly, the third write data DATA3, the first write data DATA1, and the second write data DATA2 may be written in the stated order.

Figure 9:
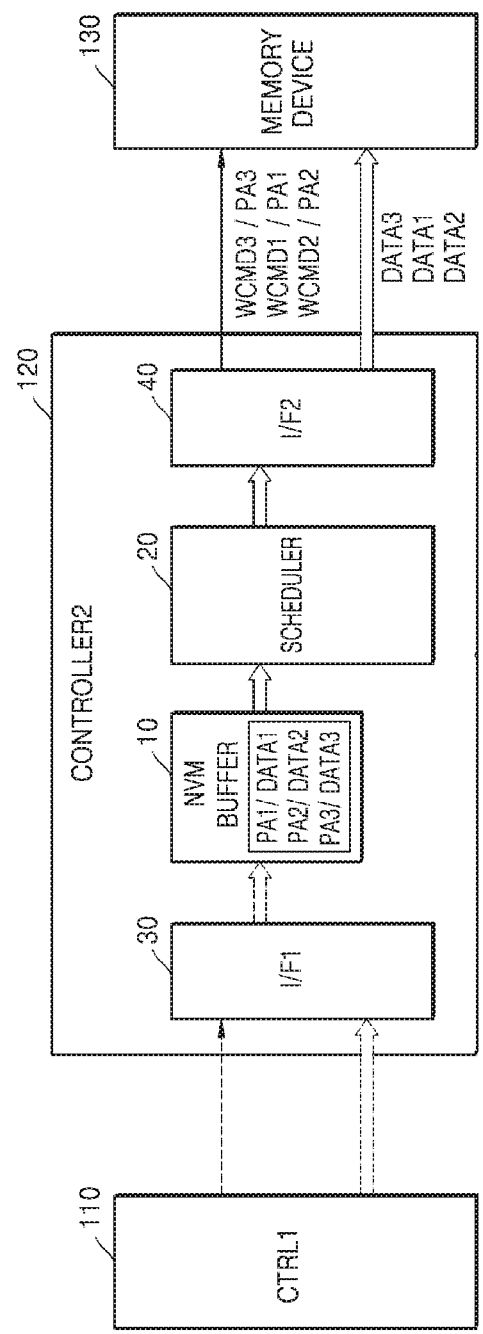
FIG. 9 is a diagram illustrating a writing method in a memory system, according to an exemplary embodiment of the inventive concept.

FIG. 9 is a diagram illustrating a writing method in the memory system according to an exemplary embodiment of the inventive concept.

Referring to FIG. 9, the second controller 120 determines a time for writing of the write data. As shown in FIG. 9, the second controller 120 receives the write data (e.g., the first to third write data DATA1 to DATA3) and the physical addresses corresponding to the data (e.g., the first to third physical addresses PA1 to PA3) from the first controller 110 and stores the first to third write data DATA1 to DATA3 and the first to third physical addresses PA1 to PA3 in the non-volatile memory buffer 10. The scheduler 20 may determine the writing time, that is, a time for writing the write data stored in the non-volatile memory buffer 10 (e.g., the first to third write data DATA1 to DATA3) in the memory device 130. The scheduler 20 may determine the writing time for each of the first to third write data DATA1 to DATA3. In an embodiment, the scheduler 20 writes the write data in the memory device 130 as a background operation when the first controller 110 does not operate or during a period when the first controller 110 is not currently sending commands and/or data to the second controller 120. The scheduler 20 may transmit the first to third write data DATA1 to DATA3 at the determined writing time for each to the memory device 130. In an exemplary embodiment, the first controller 110 provides the second controller 120 with a signal indicating whether the first controller 110 is operating or actively sending command and/or data to the second controller 230 so that the second controller 120 knows whether to perform a background operation.

Figure 10:
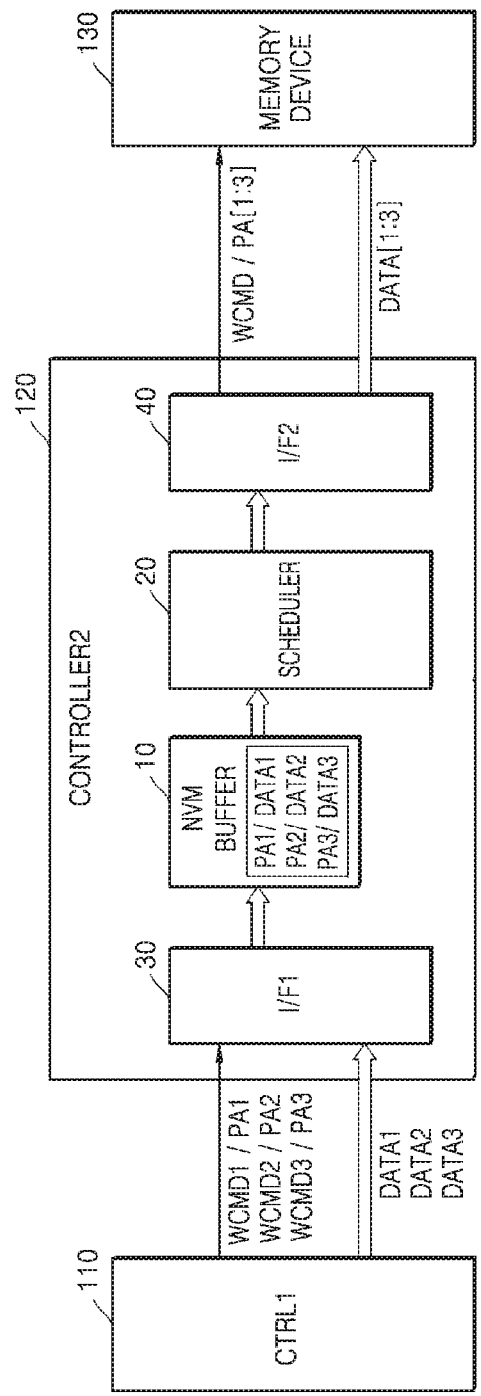
FIG. 10 is a diagram illustrating a writing method in a memory system, according to an exemplary embodiment of the inventive concept.

FIG. 10 is a diagram illustrating a writing method in a memory system according to an exemplary embodiment of the inventive concept.

Referring to FIG. 10, the second controller 120 combines the plurality pieces of write data, for example, the first to third write data DATA1 to DATA3 received from the first controller 110 and writes the combined write data DATA[1:3] in the memory device 130 at once.

For example, when the first to third write data DATA1 to DATA3 have small sizes and a size of the combined write data DATA[1:3] combining the first to third write data DATA1 to DATA3 is equal to or less than a writing unit of the memory device 130, the scheduler 20 may transmit the combined write data DATA[1:3] to the memory device 130. Accordingly, the second controller 120 may transmit to the memory device 130 the combined write data DATA[1:3], a combined physical address PA[1:3] corresponding to the combined write data DATA[1:3], and the write command WCMD, through one memory interfacing operation. The combined physical address PA[1:3] may denote the storage regions indicated respectively by the first to third physical addresses PA1 to PA3. As such, the second controller 120 may write the combined write data DATA[1:3] in the memory device 130 through one writing operation control. As described above, since the second controller 120 combines the plurality pieces of write data and writes the combined write data in the memory device 130, the number of interfacing operations in the second controller 120 may be reduced and a data processing speed of the memory system may be improved.

Figure 11A:
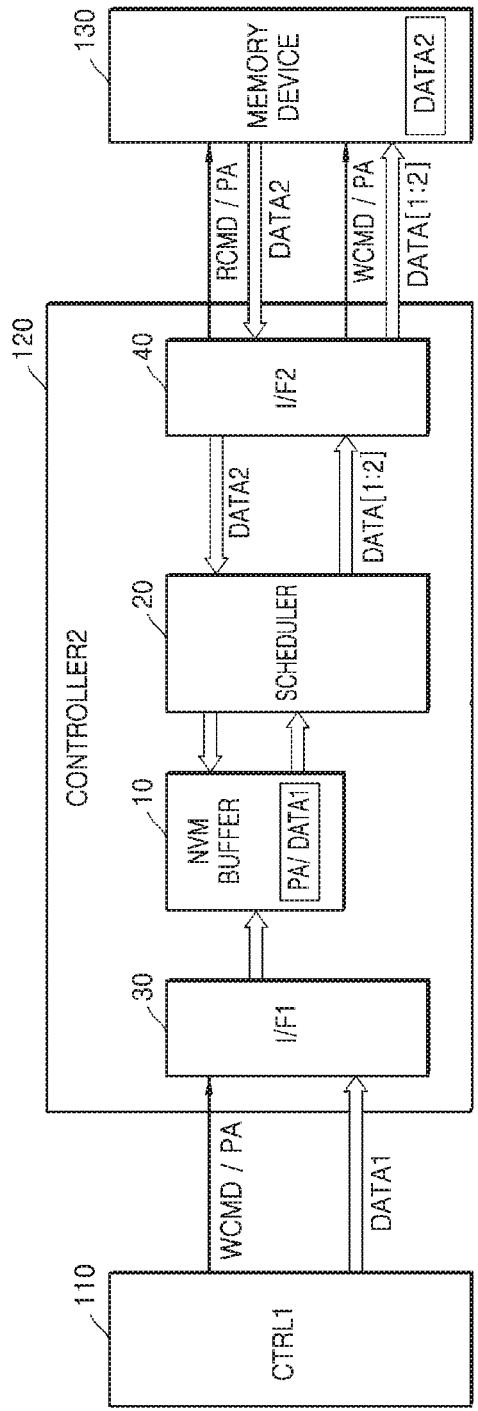
FIGS. 11A and 11B are diagrams illustrating a writing method in a memory system, according to an exemplary embodiment of the inventive concept.
Figure 11B:
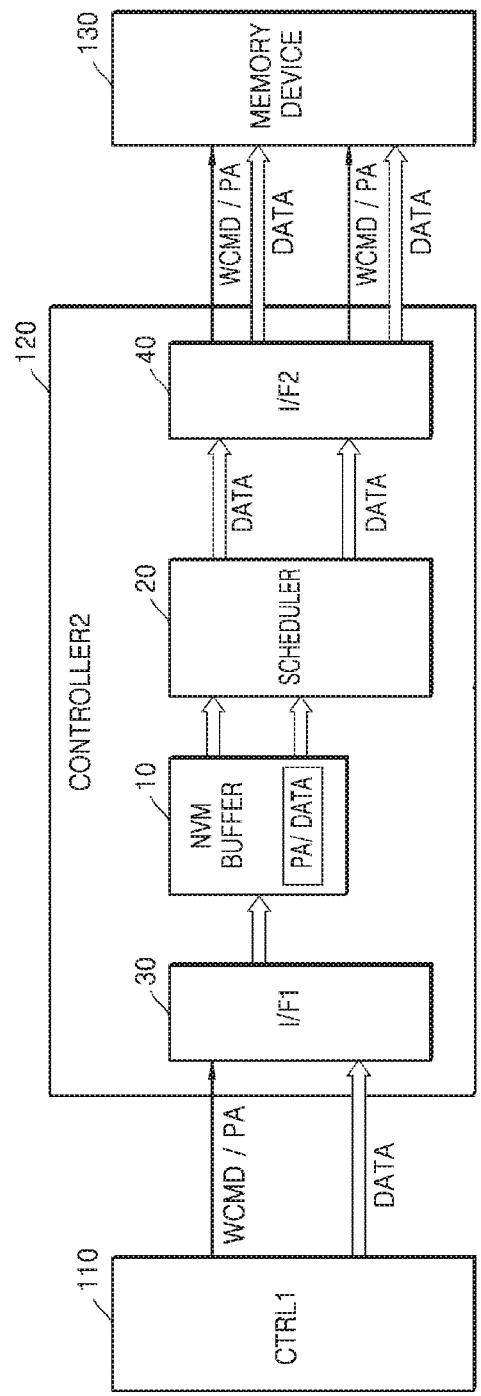

FIGS. 11A and 11B are diagrams illustrating a writing method in a memory system according to an exemplary embodiment of the inventive concept.

In FIGS. 11A and 11B, the second controller 120 controls the data to be written in the memory device 130 through at least two programming operations based on a reprogram scheme.

Referring to FIG. 11A, when receiving the first write data DATA1 from the first controller 110, the second controller 120 stores the first write data DATA1 in the non-volatile memory buffer 10 and reads the second write data DATA2 from the memory device 130. In an embodiment, the second write data DATA2 is stored in a single level block (i.e., a memory block comprised of single level cells) in the memory cell array of the memory device 130. In an embodiment, the second controller 120 stores the second write data DATA2 in the non-volatile memory buffer 10, combines the first write data DATA1 with the second write data DATA2 to generate combined write data DATA[1:2] and writes the combined write data DATA[1:2] in the memory device 130. In an embodiment, the first write data DATA1 is a most significant bit (MSB) page of the combined write data [1:2] to be written and the second write data DATA2 is a least significant bit (LSB) page of the combined write data [1:2]. The second controller 120 may write the combined write data DATA[1:2] in the memory device 130 through at least two programming operations, by writing the second write data DATA2 in the memory device 130 with a priority, reading the second write data DATA2 from the memory device 130 when receiving the first write data DATA1, and writing the combined write data DATA[1:2] in the memory device 130. If a programming failure occurs, the second controller 120 may recover the combined write data [1:2] based on the first write data DATA1 and the second write data DATA2 stored in the non-volatile memory buffer 10.

Referring to FIG. 11B, the second controller 120 reads the write data DATA that is received from the first controller 110 and stored in the non-volatile memory buffer 10 at least twice and transfers the write data DATA to the memory device 130, so as to allow the write data DATA to be programmed in the memory device 130 at least twice. In other words, the second controller 120 programs the write data DATA in the memory device 130, and then reprograms the write data DATA in the memory device 130. Here, the scheduler 20 may determine a reprogramming time point. For example, the scheduler 20 may set the write data DATA to be reprogrammed at least once in the memory device 130 after programming another write data received from the first controller 110 in the memory device 130.

As described above with reference to FIGS. 8 to 11B, in the memory system 100 (see FIG. 1) according to the embodiment, the first controller 110 transmits the write data and the physical address to the second controller 120, and the second controller 120 determines the writing order (programming order) of the write data and the number of programming operations. The second controller 120 may control the write data to be written in the memory device 130 based on the determined writing order. Accordingly, when performing the write operation, the second controller 120 buffers the write data in the non-volatile memory buffer 10 and determines the writing order, and thus, a load of the first controller 110 (the writing control load, the write data buffering load, etc.) may be reduced and the degree of freedom in operation of the first controller 110 may be improved.

Figure 12A:
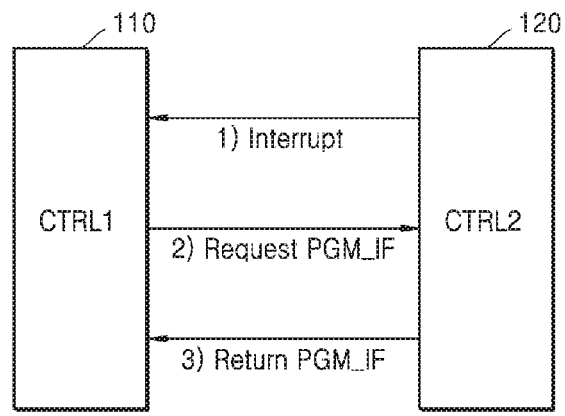
FIGS. 12A and 12B are diagrams illustrating a method of transferring program completion information in a non-volatile memory system, according to an exemplary embodiment of the inventive concept.
Figure 12B:
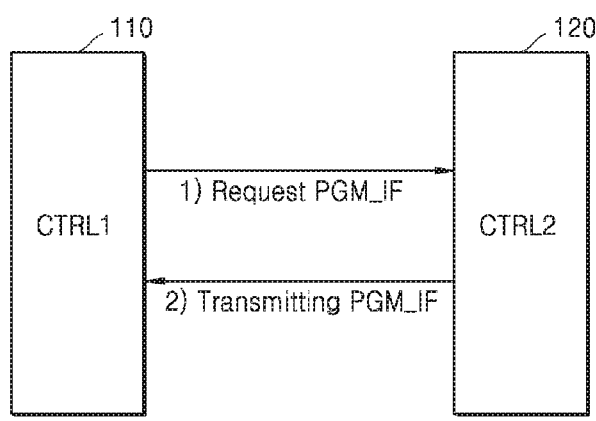

FIGS. 12A and 12B are diagrams illustrating a method of transmitting program completion information in a non-volatile memory system according to an exemplary embodiment of the inventive concept. In detail, FIGS. 12A and 12B are diagrams illustrating a method of transmitting program completion information from the second controller 120 to the first controller 110.

As described above with reference to FIG. 1, the first controller 110 controls overall writing and reading operations of the memory device 130. However, as illustrated above with reference to FIGS. 8 to 11B, the time of actually writing (or programming) the write data in the memory device 130, the writing order, and the number of programming operations are determined by the second controller 120. Since the first controller 110 manages a writing status of the write data, when the write data is actually written in the memory device 130 (see FIG. 1), that is, when the programming is finished, the second controller 120 may transmit program completion information PGM_IF to the first controller 110. For example, the program completion information PGM_IF may include pass/fail of the program, the programming completion time, and a temperature when the programming is finished. For example, the pass/fail may indicate that the programming completed successfully (pass) or failed (fail).

Referring to FIG. 12A, when the programming of the write data is finished, the second controller 120 may interrupt the first controller 110. The first controller 110 may read the program completion information PGM_IF from the second controller 120, in response to the interruption. For example, in response to a request from the first controller 110, the second controller 120 may provide the first controller 110 with the program completion information PGM_IF as a return signal. For example, the second controller 120 may send an interrupt signal to the first controller 110 indicating it has completed an attempt to program the memory device 130, the first controller 110 may then send a request signal to the second controller 120 requesting the corresponding program completion information PGM_IF in response to receipt of the interrupt signal, and then the second controller 112 may respond to the request signal with the program completion information PGM_IF.

Referring to FIG. 12B, the first controller 110 regularly reads the program completion information PGM_IF from the second controller 120. In other words, the first controller 110 may regularly request the second controller 120 for the program completion information PGM_IF. For example, the first controller 110 may periodically request the program completion information PGM_IF from the second controller 120. When receiving a request for the program completion information PGM_IF after finishing the programming of the write data, the second controller 120 may transmit the program completion information PGM_IF to the first controller 110 in response to the request.

Figure 13:
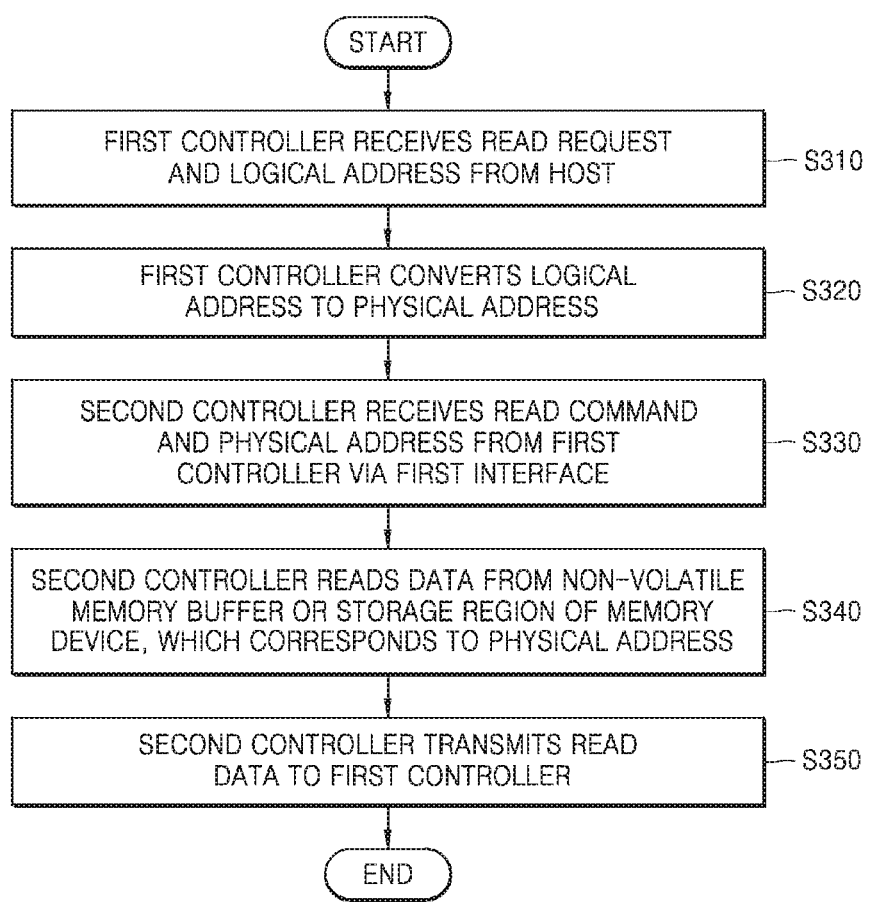
FIG. 13 is a flowchart illustrating a reading method in a memory system, according to an exemplary embodiment of the inventive concept.
Figure 14A:
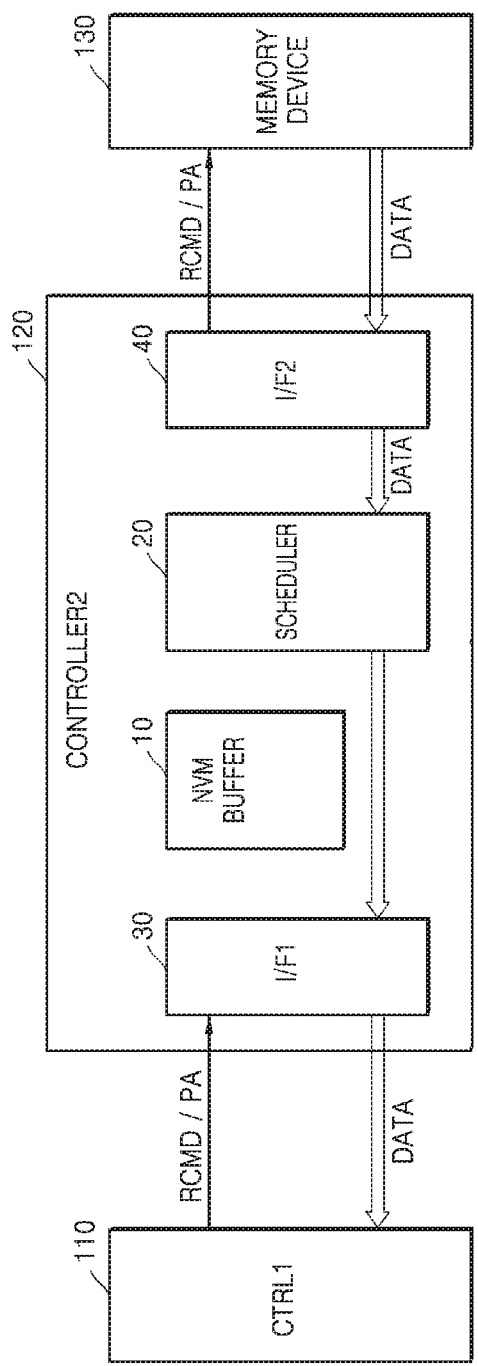
FIGS. 14A and 14B are diagrams illustrating a reading method in a memory system, according to an exemplary embodiment of the inventive concept.
Figure 14B:
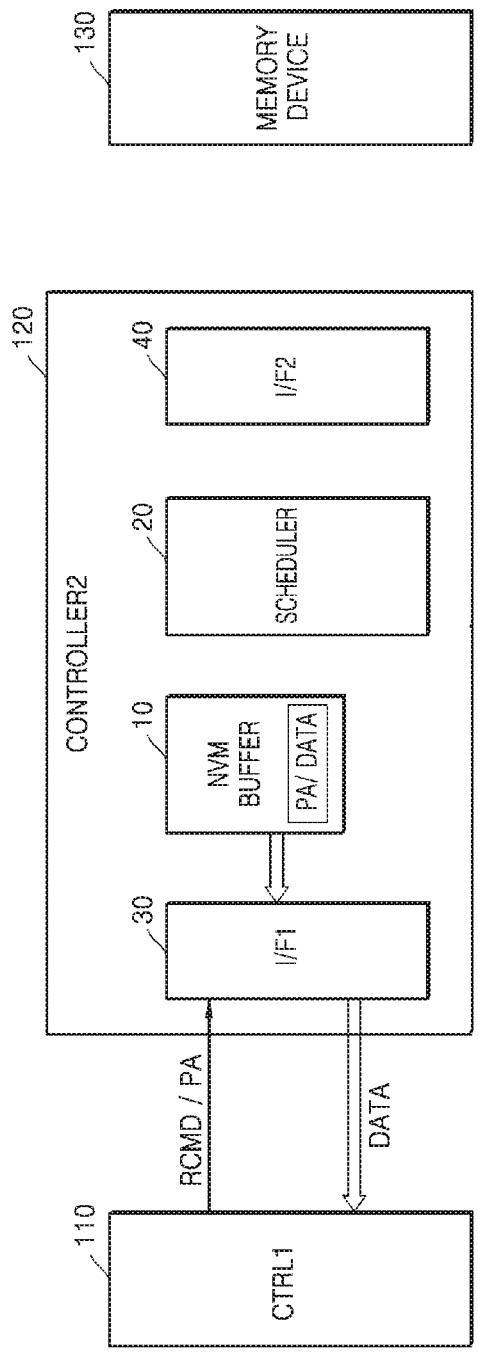

FIG. 13 is a flowchart illustrating a reading method of a memory system according to an exemplary embodiment of the inventive concept, and FIGS. 14A and 14B are diagrams illustrating the reading method of the memory system according to an embodiment.

Referring to FIG. 13, the first controller 110 receives a read request and a logical address from the host 200 (S310). The first controller 110 converts the logical address into a physical address (S320). The first controller 110 converts the logical address to the physical address by detecting the physical address corresponding to the logical address with reference to mapping information.

The second controller 120 receives a read command and a physical address from the first controller 110 via the first interface 30 (S330). The second controller 120 reads data from the non-volatile memory buffer 10 or a storage region of the memory device 130, which corresponds to the physical address PA (S340).

Referring to FIG. 14A, data DATA corresponding to the physical address PA is stored in the memory device 130. The second controller 120 reads the data DATA from the memory device 130 based on the physical address PA.

Referring to FIG. 14B, the data DATA corresponding to the physical address PA is stored in the non-volatile memory buffer 10. As described above, the time for writing the data may be determined by the second controller 120. When receiving the read command RCMD requesting that the data DATA is to be read by accessing the physical address PA before the data DATA is erased from the non-volatile memory buffer 10 before programming the data DATA stored in the non-volatile memory buffer 10 in the memory device 130 or even when the data DATA stored in the non-volatile memory buffer 10 is programmed in the memory device 130, the second controller 120 may read the data DATA from the non-volatile memory buffer 10.

In the embodiment, when receiving the read command RCMD, the second controller 120 may check whether the data DATA corresponding to the physical address PA remains in the non-volatile memory buffer 10. When the data DATA remains in the non-volatile memory buffer 10, the second controller 120 reads the data DATA from the non-volatile memory buffer 10, and when the data DATA does not remain in the non-volatile memory buffer 10, the second controller 120 reads the data DATA from the memory device 130.

Referring to FIG. 13, the second controller 120 transfers the read data to the first controller 110 (S350).

As described above, in the memory system 100 according to the embodiment, the second controller 120 receives the read command and the physical address from the first controller 110 and reads the data from the memory device 130 or the non-volatile memory buffer 10, and then, the second controller 120 may provide the data to the first controller 110.

Figure 15A:
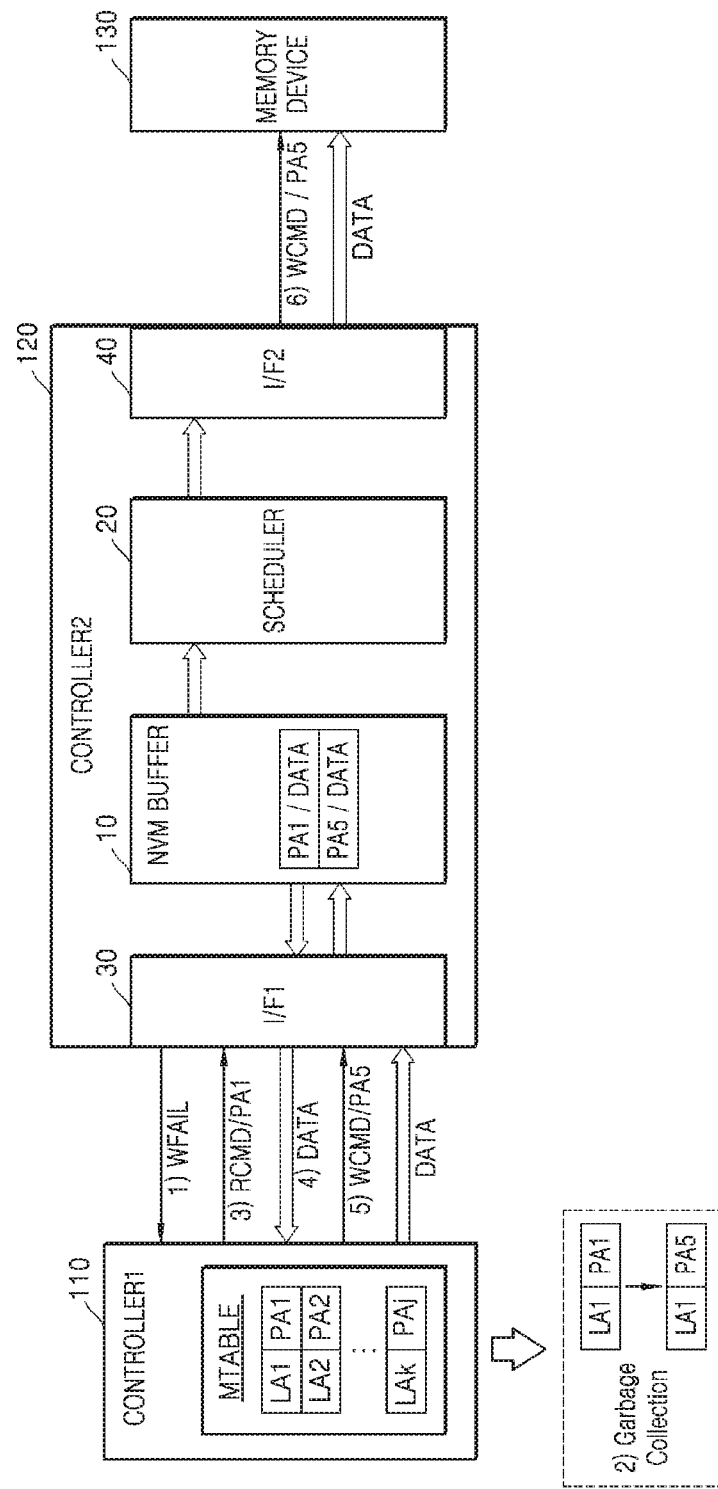
FIGS. 15A and 15B are diagrams illustrating an operating method of a memory system, according to an exemplary embodiment of the inventive concept, when a program fail occurs.
Figure 15B:
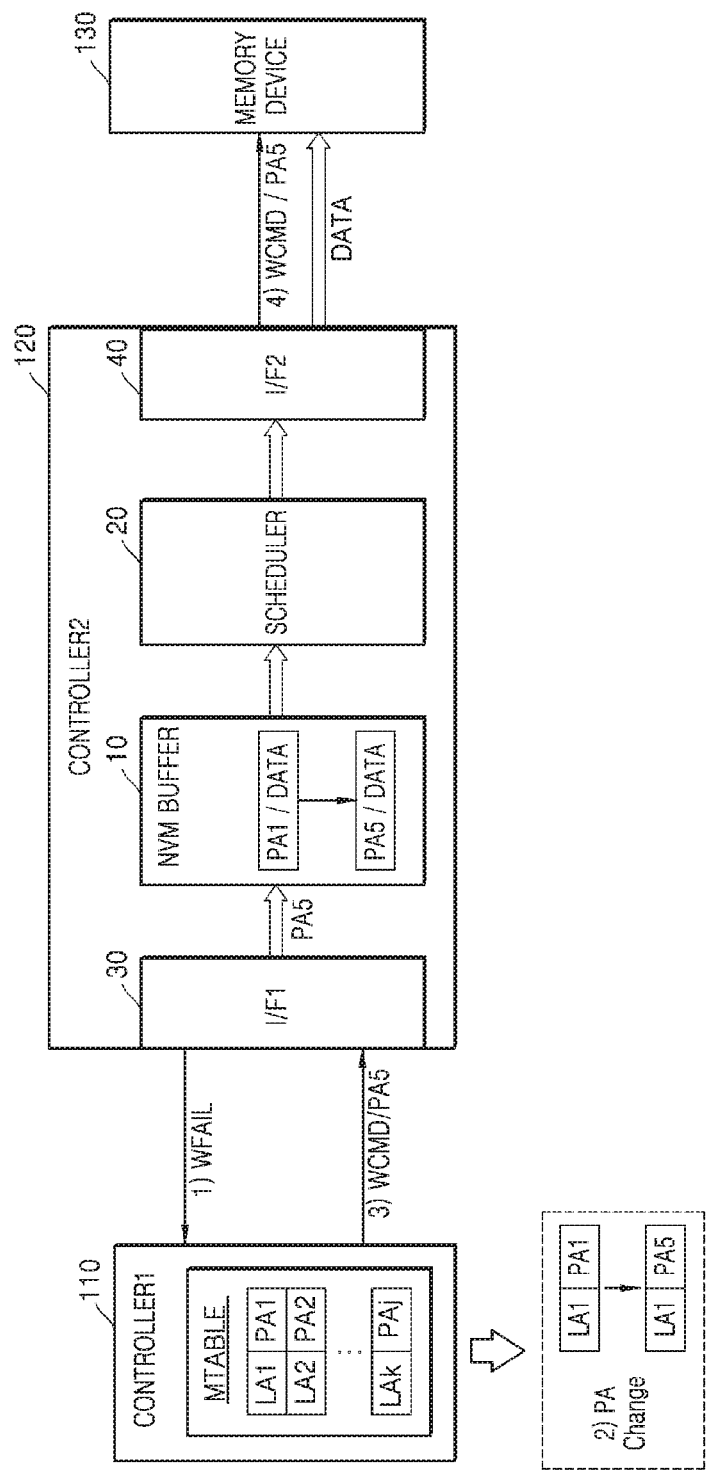

FIGS. 15A and 15B are diagrams illustrating an operating method of a memory system according to an exemplary embodiment when a program fail occurs.

Referring to FIGS. 15A and 15B, the second controller 120 controls the data DATA to be programmed in a storage region of the memory device 130, which corresponds to a first physical address PA1. However, when a programming failure (e.g., a writing failure) occurs, the second controller 120 may transmit a program fail signal WFAIL to the first controller 110. For example, as described above with reference to FIGS. 12A and 12B, the second controller 120 may transmit to the first controller 110 program completion information PGM_IF including the program fail signal WFAIL. The first controller 110 may perform an additional operation so that the write data DATA is normally written in the memory device 130.

Referring to FIG. 15A, in an embodiment, the first controller 110 determines whether to perform garbage collection according to the program completion information PGM_IF. The first controller 110 may manage a mapping table MTABLE including mapping information of a physical address corresponding to a logical address. The first controller 110 may perform garbage collection in response to receiving the program fail signal WFAIL. According to the garbage collection, an address of a storage region in which the write data DATA is to be stored (e.g., a physical address mapping to a first logical address LA1) may be changed from the first physical address PA1 to a fifth physical address PA5.

The first controller 110 may transmit to the second controller 120 a read command RCMD for requesting reading of the data from the first physical address PAL Since the data DATA corresponding to the first physical address PA1 is stored in the non-volatile memory buffer 10, the second controller 120 reads the data DATA from the non-volatile memory buffer 10 and transmits the data DATA to the first controller 110.

The first controller 110 may transmit the data DATA to the second controller 120, together with the write command WCMD and the fifth physical address PA5. The second controller 120 may store the data DATA and the fifth physical address PA5 in the non-volatile memory buffer 10 and may control the data DATA to be written in the storage region of the memory device 130, which corresponds to the fifth physical address PA5. The second controller 120 may transmit the data DATA and the fifth physical address PA5 to the memory device 130. As such, the data DATA may be programmed in the storage region of the memory device 130, which corresponds to the fifth physical address PA5.

Referring to FIG. 15B, in another embodiment, the first controller 110 determines it needs to change a physical address. For example, if a first physical address of the memory device associated with a first logic address has been written too many times or has become unreliable, the data intended to be written to the first physical address can instead be written to another physical address (e.g., a fifth physical address). When receiving the program fail signal WFAIL from the second controller 120, the first controller 110 changes the physical address corresponding to the logical address (e.g., the first logical address LA1). For example, the first controller 110 may change the physical address mapping to the first logical address LA1 from the first physical address PA1 to the fifth physical address PA5. After that, the first controller 110 may transmit the write command WCMD and the fifth physical address PA5 to the second controller 120. Here, since the data DATA is already stored in the non-volatile memory buffer 10, the first controller 110 does not re-transmit the data DATA. For example, the second controller 120 writes the data DATA from the non-volatile memory buffer 10 to a location of the memory 130 associated with the fifth physical address PA5. In the embodiment, the first controller 110 indicates that the fifth physical address PA5 is the changed address by transmitting the first physical address PA1 together with the physical address PA5.

The second controller 120 changes the storage region, in which the data DATA is to be stored, from the first physical address PA1 to the fifth physical address PA5, and may control the data DATA to be stored in the storage region of the memory device 130, which corresponds to the fifth physical address PA5.

Figure 16A:
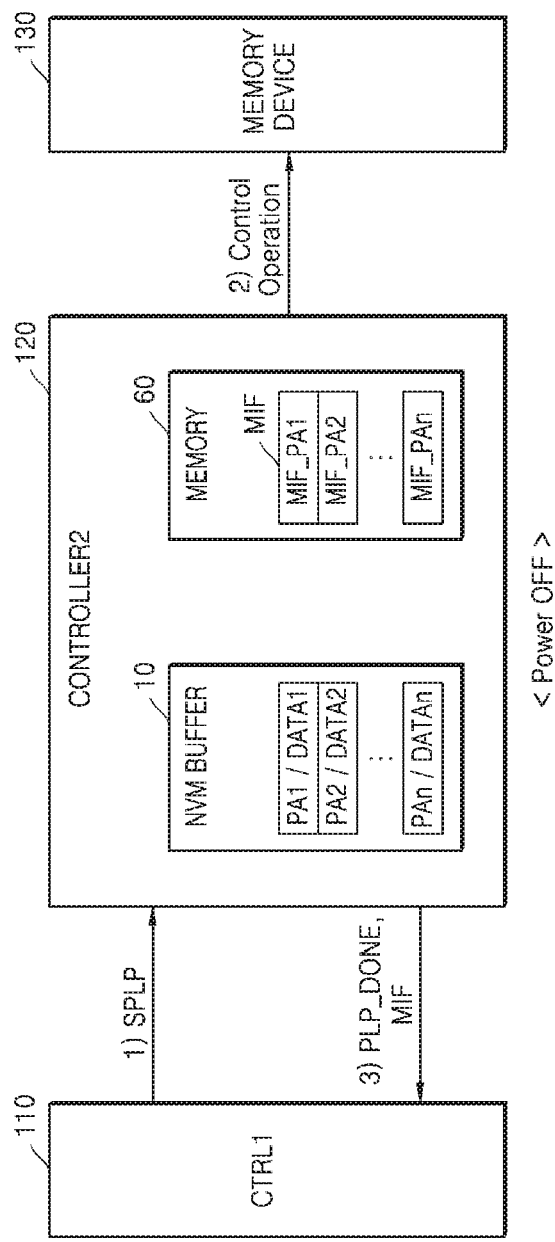
Figure 16B:
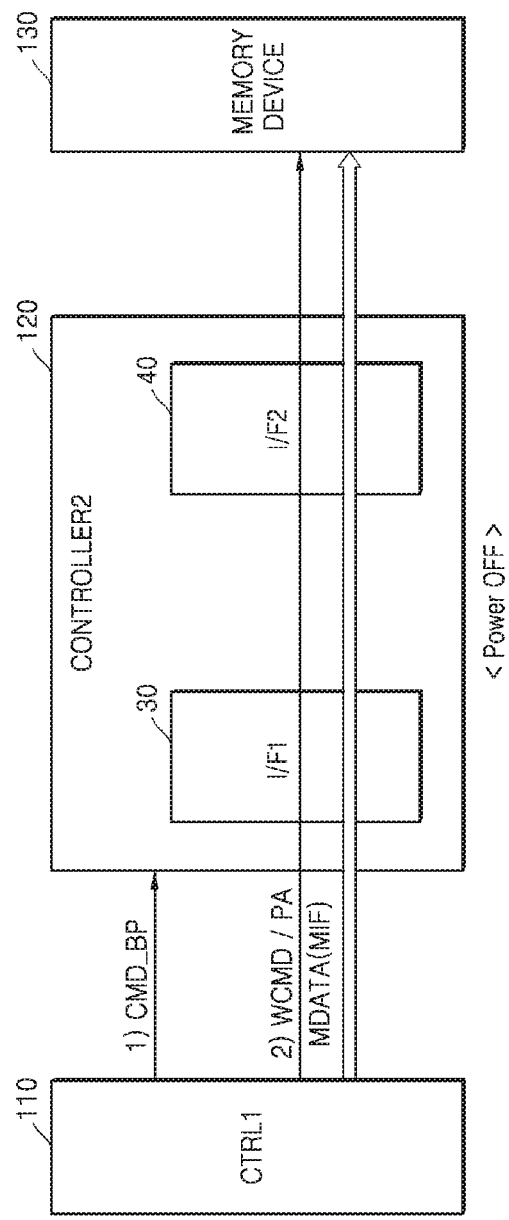
Figure 16C:
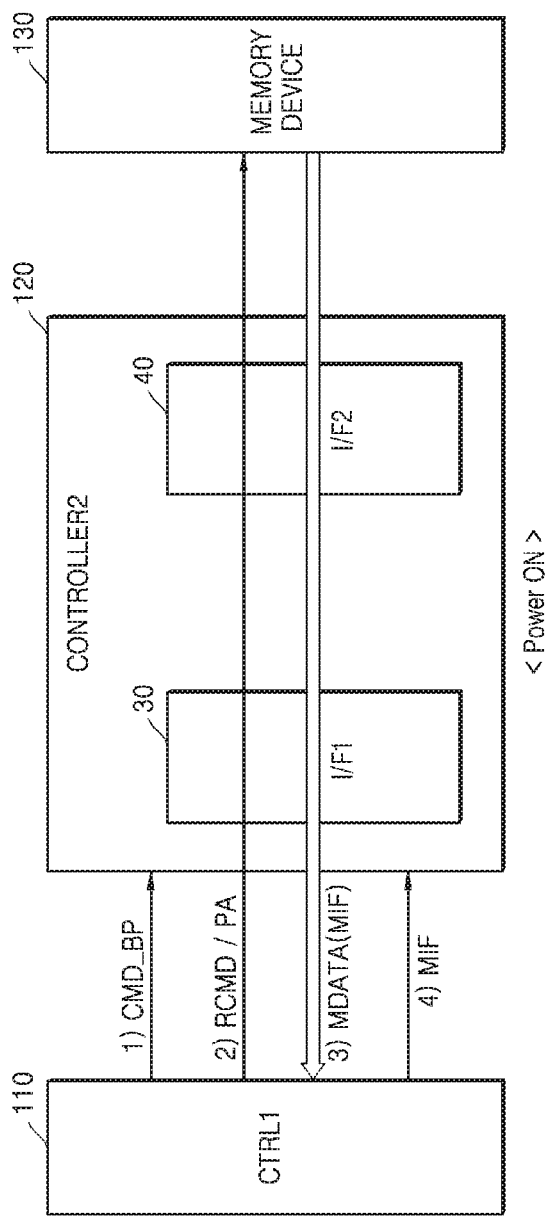
Figure 17:
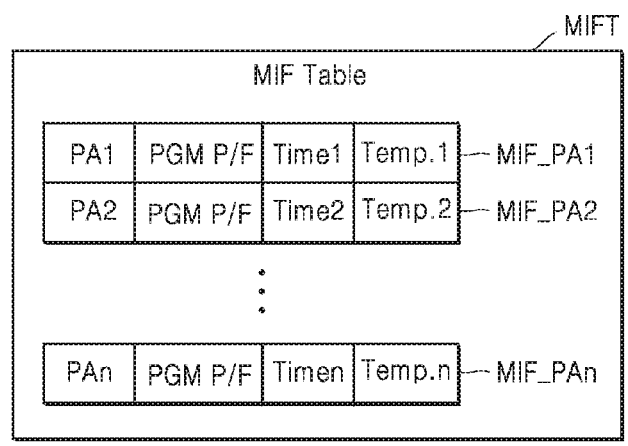
FIG. 17 is a diagram of management information according to an exemplary embodiment of the inventive concept.

FIGS. 16A, 16B, and 16C are diagrams a method of operating the memory system 100 according to an exemplary embodiment of the inventive concept, during power-off and power-on, and FIG. 17 is a diagram showing management information according to an embodiment. In FIGS. 16A, 16B, and 16C, only some elements of the second controller 120 are shown for convenience of description, but the second controller 120 may include the elements described above with reference to FIG. 4.

FIGS. 16A and 16B illustrate operations of the memory system 100 during the power-off, in particular, in a sudden power-off. FIG. 16C illustrate operations of the memory system 100 during power-on.

Referring to FIG. 16A, the first controller 110 senses the sudden power-off in the memory system 100, and when sensing the sudden power-off, the first controller 110 transmits a notification signal SPLP (e.g., a power loss protection signal) to the second controller 120.

The second controller 120 may control the memory device 130 in response to the notification signal SPLP. For example, the second controller 120 may perform an operation for protecting the data to be written in the memory device 130. In an embodiment, upon the second controller 120 receiving the notification signal SPLP, and an erase operation or a read operation is currently being performed in the memory device 130, the second controller 120 stops the erase operation or the read operation. In an exemplary embodiment, upon the second controller 120 receiving the notification signal SPLP, and a program operation is currently being performed in the memory device 130, the second controller 120 waits until the program operation is finished.

In addition, during operation of the memory system 100, the second controller 120 may generate management information MIF about the non-volatile memory buffer 10 and store the management information MIF in the memory 60. In an embodiment, the second controller 120 regularly or irregularly stores the management information MIF in the memory device 130. The management information MIF may include pieces of management information (e.g., first to n-th information) MIF_PA1 to MIF_PAn with respect to a plurality pieces of data (e.g., first to n-th data) DATA1 to DATAn stored in the non-volatile memory buffer 10. In an embodiment, the management information MIF is stored in the memory 60 as a table (e.g., a management information table MIFT of FIG. 17), as shown in FIG. 17.

Referring to FIG. 17, the management information table MIFT includes the management information MIF_PA1 to MIF_PAn with respect to the plurality pieces of data DATA1 to DATAn stored in the non-volatile memory buffer 10. The management information (e.g., the first management information MIF_PA1) includes at least one of the physical address PA1 corresponding to the first data DATA1, program pass/fail, an elapsed time from the storing of data, and a temperature at the time of storing. In addition, the management information MIF may include various information about the data.

Referring to FIG. 16A, the second controller 120 may transmit to the first controller 110 the management information MIF (e.g., the management information table MIFT of FIG. 17) with a protection completion signal PLP_DONE. In an embodiment, the second controller 120 transmits management information MIF and/or the protection completion signal PLP_DONE upon receiving the notification signal SPLP.

Referring to FIG. 16B, the first controller 110 may store metadata MDATA in the memory device 130. The first controller 110 may transmit a bypass mode setting command CMD_BP to the second controller 120. The second controller 120 may operate in a bypass mode in response to the bypass mode setting command CMD_BP. Accordingly, the second controller 120 may provide a data transmission path between the first controller 110 and the memory device 130 via the first interface 30 and the second interface 40.

The first controller 110 may transmit to the memory device 130 the metadata MDATA, the write command WCMD for writing the metadata MDATA, and the physical address PA. The metadata MDATA, the write command WCMD, and the physical address PA may be transmitted to the memory device 130 via the second controller 120. Here, the metadata MDATA may include the management information MIF received from the second controller 120. The memory device 130 may store the metadata MDATA including the management information MIF.

Referring to FIG. 16C, during the power-on, the first controller 110 transmits the bypass mode setting command CMD_BP to the second controller 120, and the second controller 120 operates in the bypass mode in response to the bypass mode setting command CMD_BP.

The first controller 110 may read the metadata MDATA from the memory device 130. The first controller 110 may transmit the read command RCMD and the physical address PA indicating the region in which the metadata MDATA is stored to the memory device 130 via the second controller 120, and thus, may read the metadata MDATA from the memory device 130. Here, the metadata MDATA may include management information MIF. The first controller 110 may transmit the management information MIF in the metadata MDATA to the second controller 120. The second controller 120 stores the management information MIF in the memory 60, and manages the data (e.g., DATA1 to DATAn of FIG. 16A) stored in the non-volatile memory buffer 10 based on the management information MIF.

In an embodiment, the second controller 120 store the management information MIF in the non-volatile memory buffer 10, and not in the memory 60. In an embodiment, the second controller 120 initially stores the management information MIF in the memory 60, but then moves the management information MIF that has been stored in the memory 60 to the non-volatile memory buffer 10 when a sudden power-off occurs. Since the non-volatile memory buffer 10 retains the stored data even when electric power is blocked, the second controller 120 does not transmit the management information MIF to the first controller 110 when the sudden power-off occurs.

Figure 18:
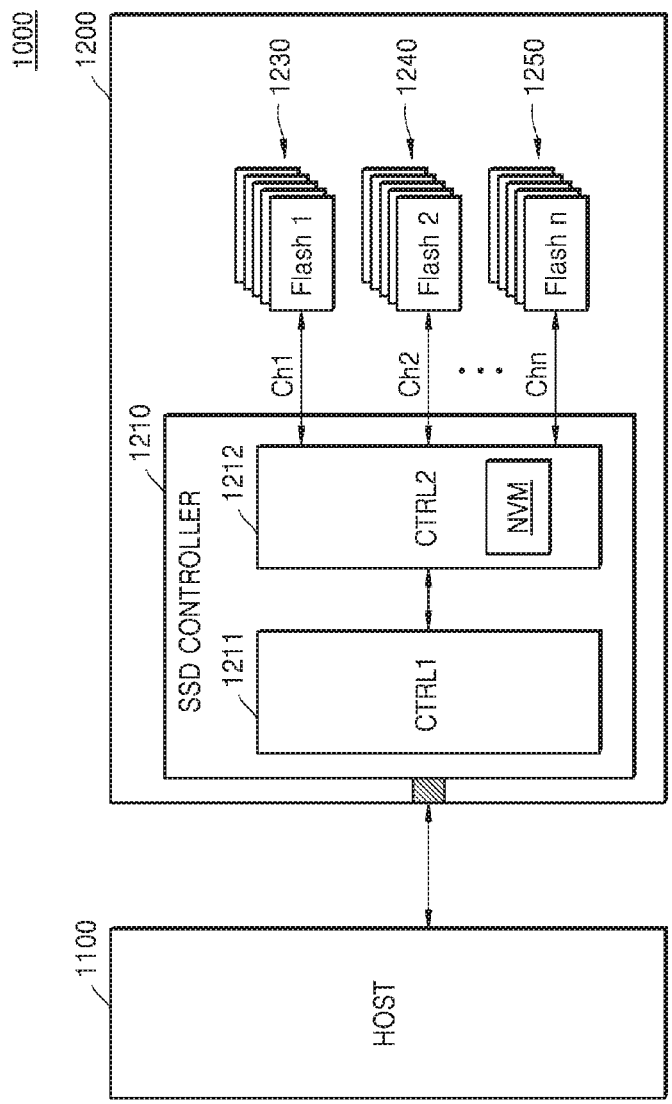
FIG. 18 is a block diagram of a solid state drive (SSD) system according to an exemplary embodiment of the inventive concept.

FIG. 18 is a block diagram of a solid state drive (SSD) system 1000 according to an exemplary embodiment of the inventive concept.

Referring to FIG. 18, the SSD system 1000 includes a host 1100 and an SSD 1200. The SSD 1200 exchanges signals with the host 1100 via the signal connector and receives an input of electric power via a power connector. The SSD 1200 may include an SSD controller 1210 and a plurality of memory devices 1230, 1240, and 1250, e.g., flash memory devices. Here, the SSD 1200 may be implemented according to the embodiments illustrated with reference to FIGS. 1 to 17.

In detail, the memory system 100 of FIG. 1 may be applied as the SSD 1200. The SSD controller 1210 may include a first controller 1211 and a second controller 1212. The first controller 1211 may be implemented by the above first controller 120 and the second controller 1212 may be implemented by the above second controller 120. The first controller 1211 communicates with the host 1100, and the second controller 1212 may communicate with the first controller 1211 and a plurality of memory devices 1230, 1240, and 1250. The first controller 1211 may control write/read operations on the plurality of memory devices 1230, 1240, and 1250. The second controller 1212 may transmit data between the first controller 1211 and the plurality of memory devices 1230, 1240, and 1250, and may schedule data write/read operations. The second controller 1212 may include a non-volatile memory NVM, and the non-volatile memory NVM may operate as a data buffer. In the embodiment, the non-volatile memory NVM is mounted in the SSD controller 1210 as a separate device from the second controller 1212. According to the SSD controller 1210 of the embodiment, a load for controlling the write/read operations and a data buffering load in the first controller 1211 may be reduced. Also, since the non-volatile memory NVM retains the data during the power-off, a capacity of the capacitor that is provided to deal with the sudden power-off may be reduced, and accordingly, an area of the SSD controller 1210 may be reduced.

In addition, the memory system according to an embodiment of the inventive concept may be mounted in or applied to a memory card system, a computing system, or a UFS, as well as the SSD system 1000. Also, a method of operating the memory system according to an embodiment of the inventive concept may be applied to various types of electronic systems, in which a non-volatile memory is mounted.

While the inventive concept has been particularly shown and described with reference to embodiments thereof, it will be understood that various changes in form and details may be made therein without departing from the spirit and scope of the inventive concept.

What is claimed is:

1. A method of operating a first memory controller that controls a non-volatile memory device, the method comprising:
   receiving, by the first memory controller, first data and a first physical address from a second memory controller external to the first memory controller via a first interface of the first memory controller;
   storing, by the first memory controller, the first data in a non-volatile memory buffer of the first controller; and
   programming, by the first memory controller, the first data stored in the non-volatile memory buffer in a first physical region of the non-volatile memory device corresponding to the first physical address,
   wherein the first memory controller waits before performing the programming upon receiving a power-off notification signal from the second memory controller and a programming operation is currently being performed on the non-volatile memory device.

2. The method of claim 1, further comprising the first memory controller providing a write completion signal to the second memory controller after storing the first data in the non-volatile memory buffer.

3. The method of claim 1, wherein the programming comprises determining an order of transmitting the first data and second data to the non-volatile memory device via a second interface of the first memory controller, wherein the second data is received from the first memory controller after receiving the first data.

4. The method of claim 1, wherein the programming comprises the first memory controller transmitting the first data and the first physical address to the non-volatile memory device while the second memory controller does not operate.

5. The method of claim 1, wherein the receiving comprises receiving a second physical address and second data from the second memory controller, the second physical address corresponding to a second physical region of the non-volatile memory device, wherein the programming comprises transmitting a third physical address and third data to the non-volatile memory device, the third physical address indicating a third physical region including the first physical region and the second physical region, and the third data comprising the first data and second data.

6. The method of claim 1, wherein the programming comprises:
reading second data stored in the first physical region from the non-volatile memory device; and
programming third data in the first physical region, the third data comprising the first data stored in the non-volatile memory buffer and the second data.

7. The method of claim 1, wherein the programming comprises:
reading the first data from the non-volatile memory buffer;
programming the first data in the first physical region;
re-reading the first data from the non-volatile memory buffer; and
reprogramming the first data in the first physical region.

8. The method of claim 1, further comprising, when the first data is programmed in the first physical region, providing program status information about the first data to the second memory controller.

9. The method of claim 1, further comprising:
receiving a read command from the second memory controller, the read command comprising a second physical address;
reading second data from the non-volatile memory buffer or the non-volatile memory device, the second data corresponding to the second physical address; and
providing the second data to the second memory controller.

10. The method of claim 1, further comprising storing, in an internal memory or the non-volatile memory buffer, management information about data stored in the non-volatile memory buffer.

11. The method of claim 10, wherein the management information comprises at least one of a physical address corresponding to the data, whether to perform programming of the data, a programming result, a time point of finishing the programming, and a temperature at the time point of finishing the programming.

12. The method of claim 10, further comprising:
receiving, by the first memory controller, the power-off notification signal from the second memory controller;
providing, by the first memory controller, the management information to the second memory controller in response to receipt of the power-off notification signal;
receiving, by the first memory controller, the management information from the second memory controller during power-on; and
storing, by the first memory controller, the management information in the internal memory or the non-volatile memory buffer.

13. The method of claim 12, further comprising:
writing, by the first memory controller, the management information in the non-volatile memory device; and
reading, by the first memory controller, the management information from the non-volatile memory device during the power-on.

14. The method of claim 1, wherein the non-volatile memory buffer comprises magnetoresistive random access memory.

15. A method of operating a memory control system that controls a non-volatile memory device, the method comprising:
receiving, by a second controller, write data and a physical address from a first controller via a first interface;
storing, by the second controller, the write data in a non-volatile memory buffer included in the second controller;
outputting, by the second controller, a write completion signal to the first memory controller after storing the write data in the non-volatile memory buffer;
performing, by the second controller, a write operation on the non-volatile memory device, using the write data stored in the non-volatile memory buffer and the first physical address; and
outputting, by the second controller, a signal to the first controller indicating whether the write operation on the non-volatile memory device completed successfully or failed.

16. The method of claim 15, further comprising:
receiving, by the first controller, the write data and a logical address from a host; and
converting, by the first controller, the logical address to the physical address.

17. The method of claim 15, wherein the performing of the write operation comprises programming, by the second controller, the write data in the physical address at least twice based on a set programming method.

18. The method of claim 15, wherein the performing of the write operation comprises:
determining, by the second controller, a writing order of first write data and second write data stored in the non-volatile memory buffer; and
providing the first write data and the second write data to the non-volatile memory device based on the determined writing order.

19. The method of claim 15, wherein the non-volatile memory device comprises a plurality of non-volatile memory chips each comprising a multi-bit memory cell.

20. A memory system comprising:
a first controller receiving an access request for a non-volatile memory device and a logical address from a host, the first controller being configured to convert the logical address to a physical address; and
a second controller receiving the physical address from the first controller, the second controller controlling write data to be written in a storage region of the non-volatile memory device, the storage region corresponding to the physical address and controlling read data to be read from the storage region,
wherein the second controller stores the write data received from the first controller in a non-volatile memory buffer included in the second controller, provides a write completion signal to the first memory controller after storing the write data in the non-volatile memory buffer, and schedules the write data stored in the non-volatile memory buffer to be programmed on the non-volatile memory device.

* * * * *